US009089971B2

(12) United States Patent
Aoba

(10) Patent No.: US 9,089,971 B2
(45) Date of Patent: Jul. 28, 2015

(54) INFORMATION PROCESSING APPARATUS, CONTROL METHOD THEREOF AND STORAGE MEDIUM

(75) Inventor: Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 13/428,372

(22) Filed: Mar. 23, 2012

(65) Prior Publication Data

US 2012/0259462 A1 Oct. 11, 2012

(30) Foreign Application Priority Data

Apr. 11, 2011 (JP) .................................. 2011-087698

(51) Int. Cl.
*G06F 19/00* (2011.01)
*B25J 9/16* (2006.01)

(52) U.S. Cl.
CPC ..... *B25J 9/1697* (2013.01); *G05B 2219/40004* (2013.01); *G05B 2219/40053* (2013.01)
USPC ........... 700/245; 700/246; 700/249; 700/250; 700/252; 700/257; 700/258; 700/260; 700/261; 700/262; 318/568.11; 318/568.12; 318/568.16

(58) Field of Classification Search
USPC ......... 700/245, 246, 249, 250, 252, 257, 258, 700/260, 261, 262; 318/568.11, 568.12, 318/568.16; 901/1, 2, 8, 46
See application file for complete search history.

(56) References Cited

U.S. PATENT DOCUMENTS

| 5,446,835 | A | 8/1995 | Iida et al. | |
|---|---|---|---|---|
| 6,328,523 | B1 * | 12/2001 | Watanabe et al. | 414/416.01 |
| 7,123,992 | B2 * | 10/2006 | Ban et al. | 700/258 |
| 7,313,464 | B1 * | 12/2007 | Perreault et al. | 700/245 |
| 7,996,114 | B2 * | 8/2011 | Ban et al. | 700/259 |
| 8,437,535 | B2 * | 5/2013 | Boca et al. | 382/154 |
| 8,660,685 | B2 * | 2/2014 | Irie et al. | 700/213 |
| 8,660,697 | B2 * | 2/2014 | Handa et al. | 700/259 |
| 2010/0324737 | A1 * | 12/2010 | Handa et al. | 700/259 |
| 2011/0122231 | A1 * | 5/2011 | Fujieda et al. | 348/47 |

FOREIGN PATENT DOCUMENTS

JP      2555823 B2      11/1996
JP      2007-245283 A    9/2007

OTHER PUBLICATIONS

Schraft et al., Intelligent picking of chaotical stored objects, 2003, Assembly Automation, vol. 23 • No. 1 • pp. 38-42 MCB UP Limited • ISSN 0144-5154.*

* cited by examiner

*Primary Examiner* — Khoi Tran
*Assistant Examiner* — Jaime Figueroa
(74) *Attorney, Agent, or Firm* — Fitzpatrick, Cella, Harper & Scinto

(57) ABSTRACT

An information processing apparatus for performing recognition processing by a recognizer for a position and orientation of a work subject to undergo work by a working unit of a robot arm. The information processing apparatus including an obtaining unit adapted to obtain, for each of a plurality of positions and orientations of the work subject, a position and an orientation of the working unit in which the working unit can perform the work, and a restriction unit adapted to restrict a position and an orientation of the work subject used in the recognition processing by the recognizer to a position and an orientation of the work subject corresponding to the position and the orientation of the working unit that have been obtained by the obtaining unit.

13 Claims, 21 Drawing Sheets

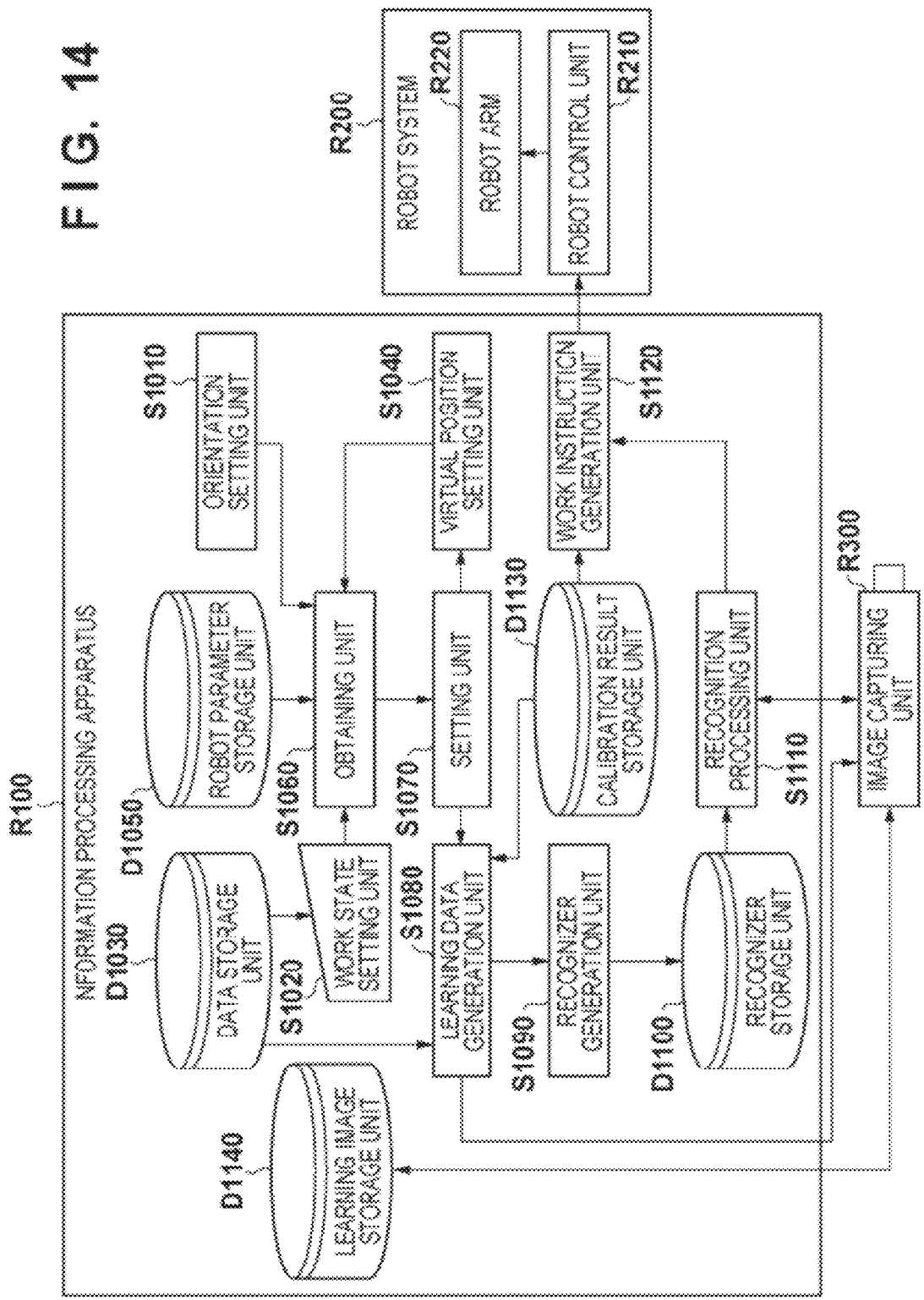

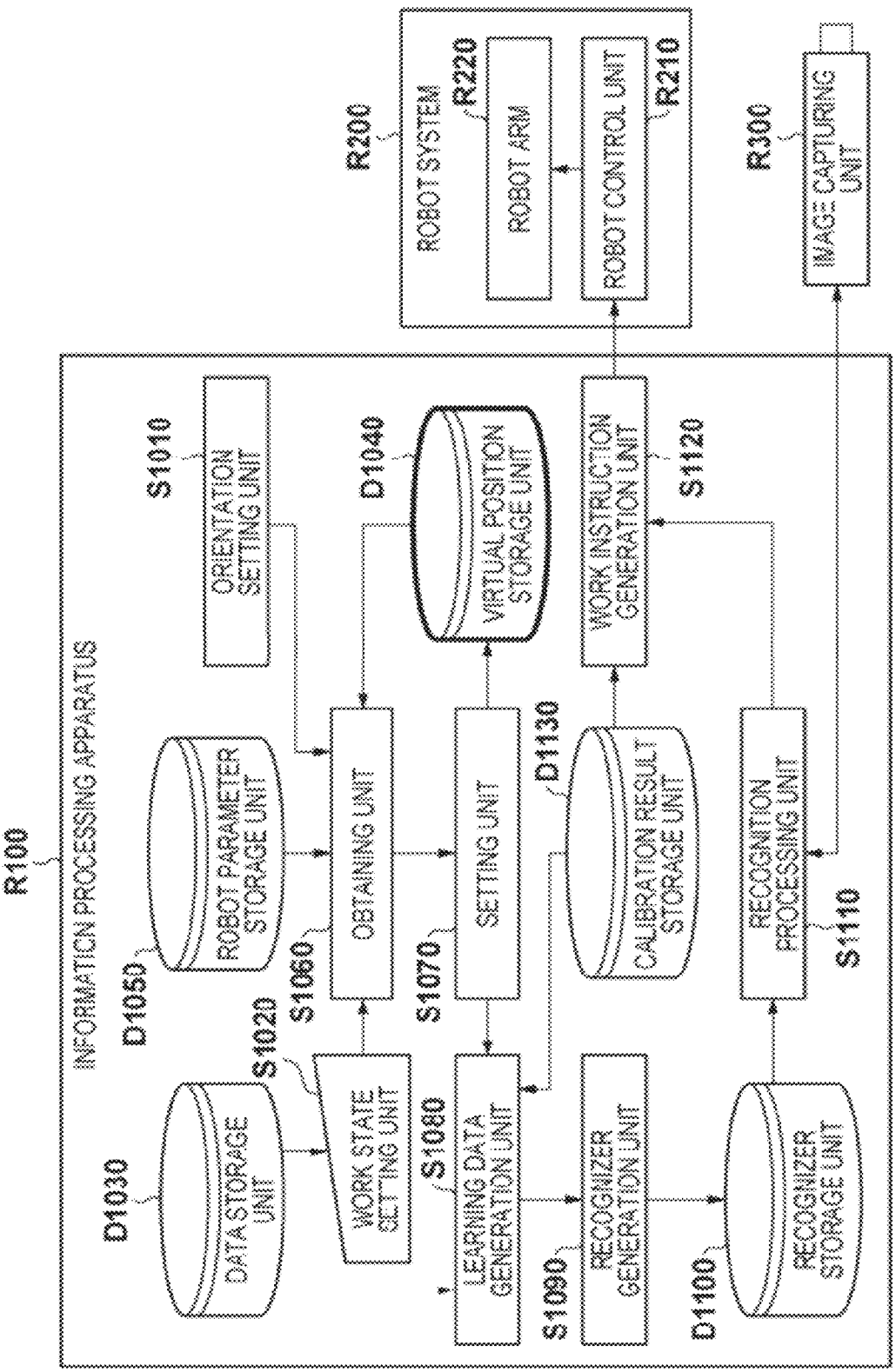

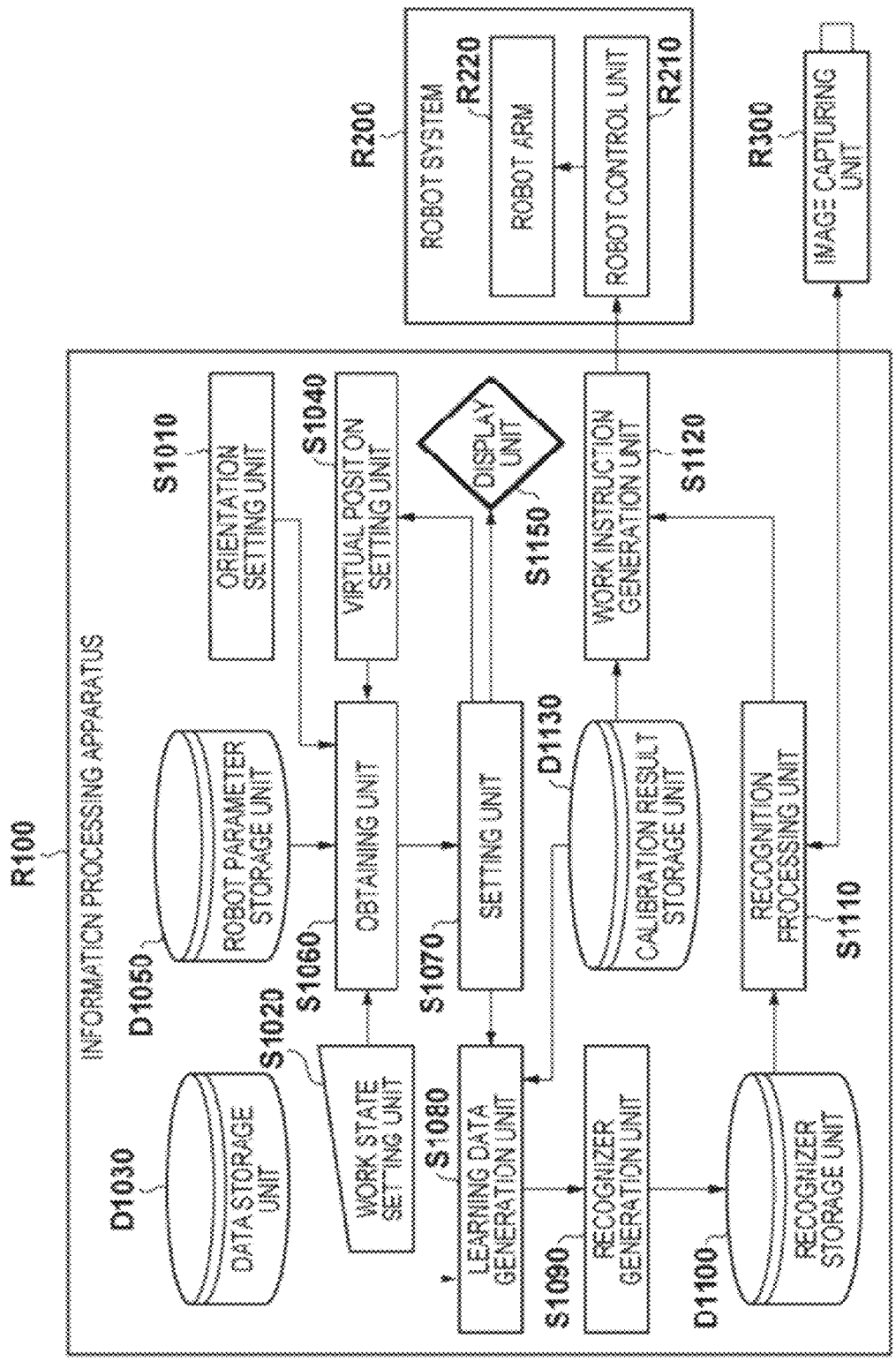

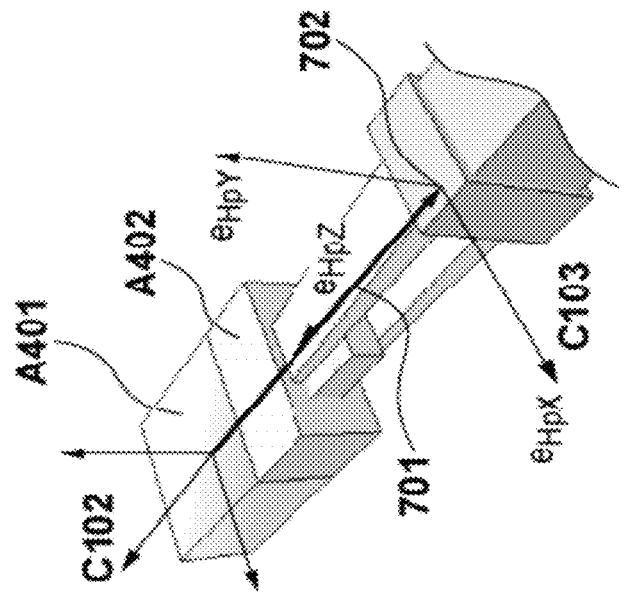
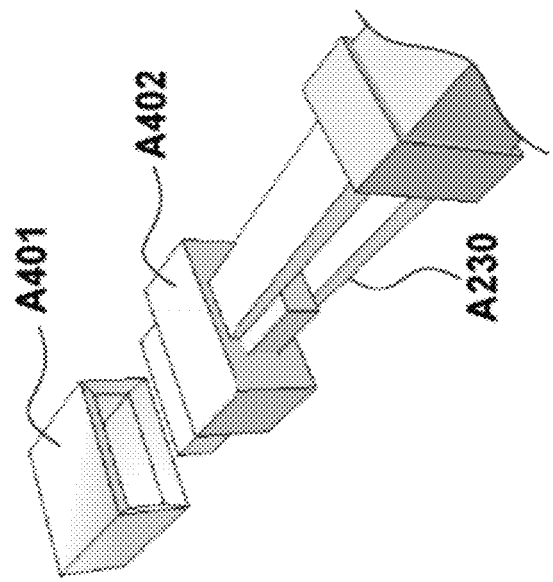
FIG. 18A
FIG. 18B

INFORMATION PROCESSING APPARATUS, CONTROL METHOD THEREOF AND STORAGE MEDIUM

BACKGROUND OF THE INVENTION

1. Field of the Invention

The present invention relates to an information processing apparatus, control method thereof, and storage medium and, more particularly, to an information processing apparatus which generates a recognizer for recognizing a work subject and estimates the three dimensional positions and orientations of piled work subjects using the generated recognizer in order to perform predetermined work with a robot

2. Description of the Related Art

In the field of recognition using visual information, various researches and developments have been made in regard to a method of estimating the three dimensional position and orientation of a subject. In the field of industrial robots or experimental humanoid robots, three dimensional information is often used for the purpose of random picking and the like, and its necessity is growing. When the orientation of a target subject to be handled has a high degree of freedom, various orientations of the target subject need to be estimated three-dimensionally. As for a target subject with a known shape, its position and orientation are estimated using a three dimensional sensor such as a stereo camera or laser range finder. The correspondence between a three dimensional feature amount obtained from the three dimensional sensor and a three dimensional feature amount regarding a plurality of feature points on a model is obtained. Then, the position and orientation of the subject are calculated using rigid transformation. The position and orientation of a target subject are also estimated using a monocular camera. There is a method of recognizing various orientations as a multi-class classification problem.

Even if a target subject has a three dimensional degree of freedom, it may suffice to recognize only restricted orientations for practical use. In gripping work for a target subject with a robot hand, a detected target subject in an estimated orientation may not be able to be gripped owing to the relative positional relationship with the robot. A task to detect such a target subject is wasteful and can be ignored from the beginning without any problem. Especially in the field of industrial robots, this restriction is often essential. Taking the trouble to detect a target subject in an orientation incapable of gripping increases the memory capacity and prolongs the detection processing time in a recognizer used for detection.

In Japanese Patent No. 2555823, when collating parts based on the contours of images of piled parts, a collation limit value indicating a mismatch range permitted for a collation model in a reference orientation is set based on a tolerance limit angle in a grippable range. This method does not set a high degree of freedom of the orientation, and a target subject is detected by relaxing the collation limit value from one reference orientation to permit variations of the orientation from the reference orientation.

The method disclosed in Japanese Patent No. 2555823 takes account of an orientation range considering grippability, but does not examine a case in which the degree of freedom of the orientation is high. Further, it is difficult to apply this method when the appearance of a target subject greatly changes depending on the orientation.

In consideration of the aforementioned problems, the present invention provides a technique of reducing the memory capacity of a recognizer used in actual work for a target subject with a high degree of freedom of the orientation, and shortening the recognition processing time when detecting a target subject.

SUMMARY OF THE INVENTION

According to one aspect of the present invention, there is provided an information processing apparatus for performing recognition processing by a recognizer for a position and orientation of a work subject to undergo work by a working unit of a robot arm, comprising: an obtaining unit adapted to obtain, for each of a plurality of positions and orientations of the work subject, a position and orientation of the working unit in which the working unit can perform the work; and a restriction unit adapted to restrict a position and orientation of the work subject used in the recognition processing by the recognizer to a position and orientation of the work subject corresponding to the position and orientation of the working unit that have been obtained by the obtaining unit.

According to one aspect of the present invention, there is provided a method of controlling an information processing apparatus which includes an obtaining unit and a restriction unit, and performs recognition processing by a recognizer for a position and orientation of a work subject to undergo work by a working unit of a robot arm, comprising: causing the obtaining unit to obtain, for each of a plurality of positions and orientations of the work subject, a position and orientation of the working unit in which the working unit can perform the work; and causing the restriction unit to restrict a position and orientation of the work subject used in the recognition processing by the recognizer to a position and orientation of the work subject corresponding to the position and orientation of the working unit that have been obtained by the obtaining unit.

Further features of the present invention will be apparent from the following description of exemplary embodiments with reference to the attached drawings.

BRIEF DESCRIPTION OF THE DRAWINGS

FIG. 14 is a block diagram for explaining the arrangement of apparatuses in a system according to the second embodiment;

FIGS. 15A to 15C are block diagrams exemplifying variations of the apparatus arrangement of a system according to the fourth embodiment;

FIG. 17 is a block diagram for explaining an example of the arrangement of apparatuses in the system according to the fourth embodiment;

FIGS. 18A and 18B are views showing fitting work;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
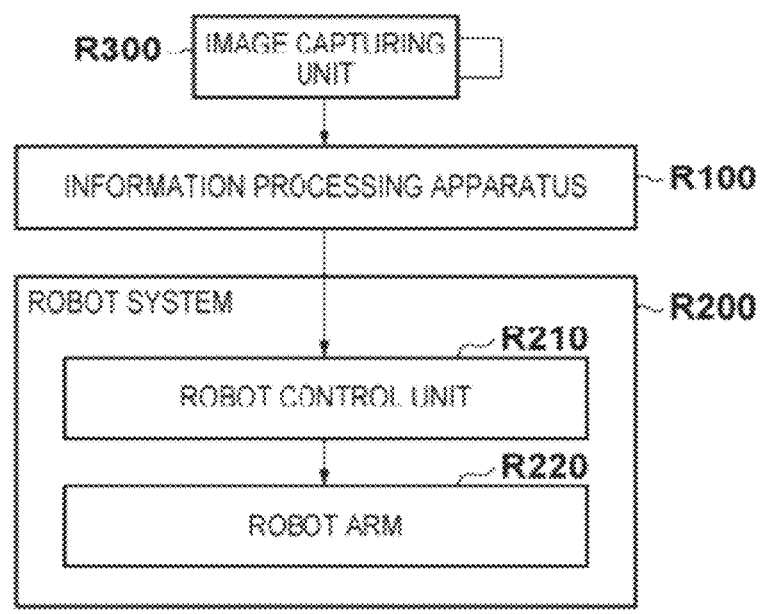
FIG. 1 is a block diagram for explaining the arrangement of an overall system including the present invention.

An outline of an overall system using an information processing apparatus according to the present invention will be described with reference to FIG. 1. First, an outline of the system will be explained, and then details will be described. As an operation in online actual work, an image capturing unit R300 captures an image of a work subject serving as the work target of a robot system R200. The image capturing information is sent to an information processing apparatus R100. The information processing apparatus R100 estimates the position and orientation of the work subject. The information processing apparatus R100 sends a work instruction generated based on the estimation result to a robot control unit R210 of the robot system R200. The robot control unit R210 operates a robot arm R220 in accordance with the received work instruction, and performs predetermined work on the work subject. The information processing apparatus R100 generates a recognizer offline in advance to estimate the position and orientation of a work subject in actual work. At this time, a position/orientation range to be obtained is restricted and set based on the orientation of the work subject based on the workability of the robot arm R220, and then the recognizer is generated.

Figure 2:
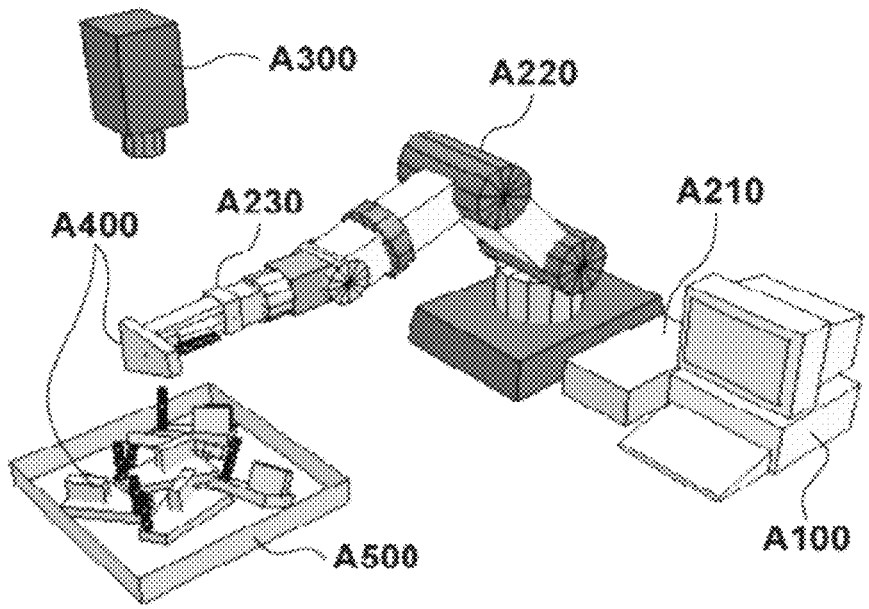
FIG. 2 is a view exemplifying the detailed arrangement of the system including the present invention.

A detailed hardware arrangement of the system will be exemplified with reference to FIG. 2. A robot controller A210 and robot arm A220 are building components of the robot system R200 in FIG. 1. The robot controller A210 corresponds to the robot control unit R210, and the robot arm A220 corresponds to the robot arm R220. Work subjects A400 are subjects to undergo work by the robot arm A220. A plurality of work subjects A400 are placed on a tray A500. A camera A300 corresponds to the image capturing unit R300 in FIG. 1. The camera A300 may be a monocular camera for obtaining image information, a stereo camera or TOF sensor for obtaining distance information, or an apparatus formed from a combination of a camera and projector using a light-section method, spatial coding method, or the like. The robot arm A220 is equipped with an end effector A230 for performing predetermined work (for example, gripping work) on a target subject. A computer A100 includes the information processing apparatus R100 in FIG. 1.

In online actual work, information about work subjects piled on the tray A500 that has been obtained by image capturing by the camera A300 is sent to the computer A100. The computer A100 executes calculation using the recognizer, and estimates the positions and orientations of the work subjects A400 on the tray A500. An instruction to perform predetermined work is encoded based on the position and orientation of a designated work subject A400, and is sent to the robot controller A210. The robot controller A210 decodes the received instruction, and operates the robot arm A220 and end effector A230 to perform predetermined work on the recognized work subject A400. The recognizer in the information processing apparatus R100 is a class classifier for classifying three dimensional positions and orientations of the work subject A400. The recognizer recognizes the position and orientation of a work subject by determining a class to which information obtained from the image capturing unit R300 belongs. The embodiment explains one type of work subject, but work subjects are not always limited to one type. When recognizing a plurality of types of work subjects, recognizers can also be generated for the respective types of work subjects by increasing the number of classes. The information processing apparatus R100 generates this recognizer offline in advance before actual work. At this time, to reduce the memory capacity of the recognizer and shorten the recognition processing time when detecting a work subject, the following processing is performed to restrict the position/orientation range of a work subject to be detected.

Figure 3:
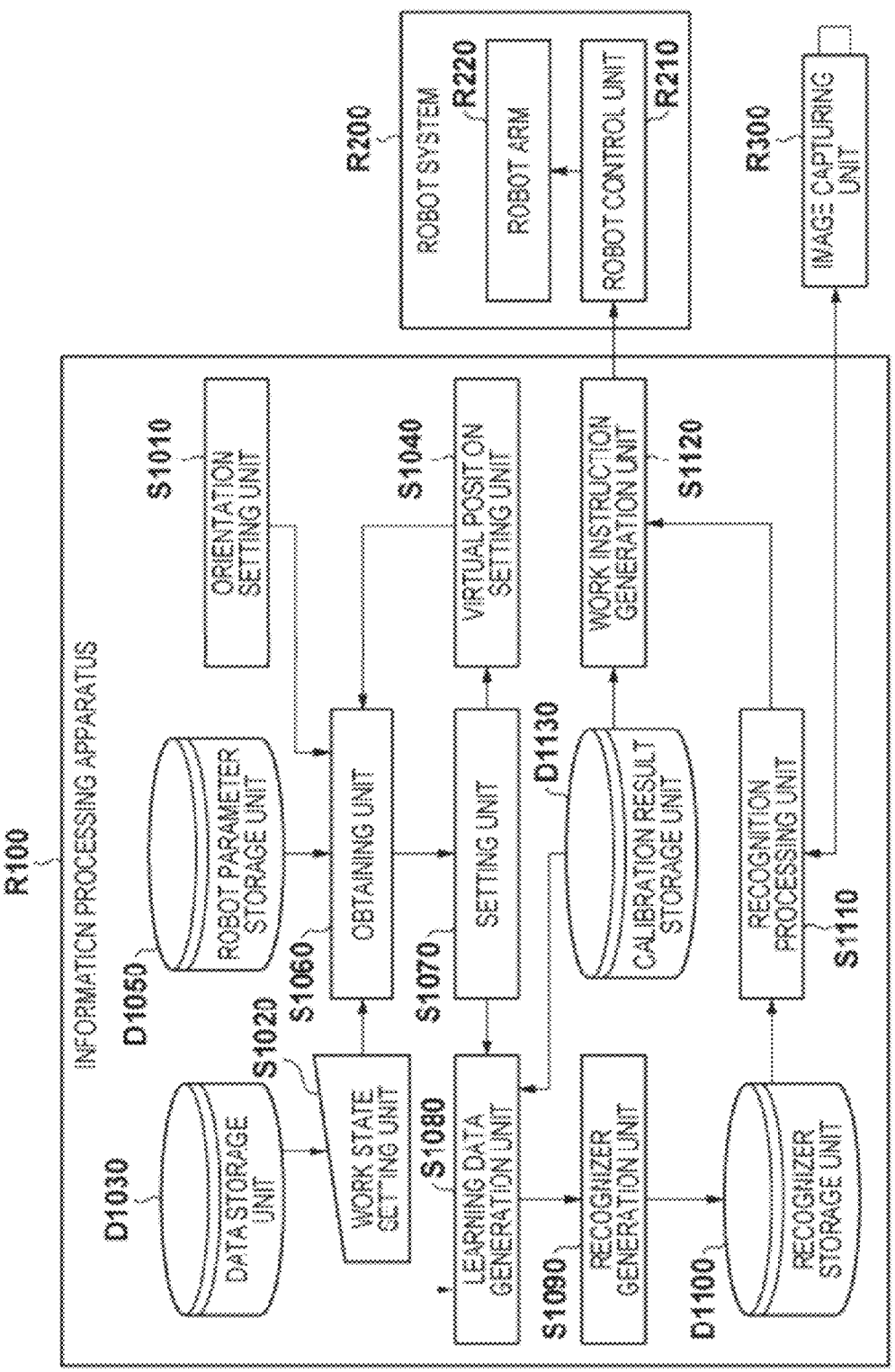
FIG. 3 is a block diagram for explaining the arrangement of apparatuses in the system according to the first embodiment.

The functional arrangement of the information processing apparatus R100 for restricting the position/orientation range of a work subject to be detected as described above will be explained with reference to FIG. 3. The information processing apparatus R100 includes an orientation setting unit S1010, work state setting unit S1020, data storage unit D1030, virtual position setting unit S1040, robot parameter storage unit D1050, obtaining unit S1060, setting unit S1070, learning data generation unit S1080, recognizer generation unit S1090, recognizer storage unit D1100, recognition processing unit S1110, work instruction generation unit S1120, and calibration result storage unit D1130.

The orientation setting unit S1010 generates an orientation set $\Theta=\{\theta_j\}$ (j=1, . . . , N) which may be handled by the recognizer. N is the total number of orientations which express all classes. The orientation setting unit S1010 sends the generated orientation set $\Theta$ to the obtaining unit S1060.

The work state setting unit S1020 sets the state of work on the work subject A400 by the end effector A230. The work state is determined by predetermined work contents. For example, when the work contents indicate gripping work with fingers, the work state is expressed by the relative position and orientation of the work subject A400 and end effector A230 in a state in which the end effector A230 grips the work subject A400 with fingers at a gripping position.

The data storage unit D1030 stores in advance model data of the work subject A400 and data of the end effector A230 as three dimensional model data. The physical coordinate system of the work subject A400 and the end effector coordinate system of the end effector A230 are set. The virtual position setting unit S1040 sets a virtual position within a work area to be described later.

The robot parameter storage unit D1050 stores known values determined by design values as characteristic parameters of the robot arm R220, such as the limit values of the link length and joint rotation angle. The obtaining unit S1060 functions as an obtaining means for obtaining the orientation set Θ calculated by the orientation setting unit S1010, the relative position p and relative orientation $E_{Hp}$ set by the work state setting unit S1020, and the virtual position $X_k$ set by the virtual position setting unit S1040, and calculating and obtaining, based on them, the orientation of the work subject A400 to be detected.

The setting unit S1070 functions as a restriction means for setting restricted orientations necessary to generate a recognizer, based on workability in each orientation calculated by the obtaining unit S1060, so as to restrict the orientation range of the work subject A400. The learning data generation unit S1080 generates learning data of the work subject A400 in a restricted orientation. The recognizer generation unit S1090 generates a recognizer using the learning data generated by the learning data generation unit S1080.

The recognizer storage unit D1100 stores the recognizer generated by the recognizer generation unit S1090. The recognition processing unit S1110 recognizes the position and orientation of the work subject A400 using image data obtained by image capturing by the image capturing unit R300 and the recognizer stored in the recognizer storage unit D1100. The recognition processing unit S1110 sends the position and orientation of the work subject A400 recognized by the recognition processing unit S1110 to the work instruction generation unit S1120.

Based on the estimated position and orientation of the work subject A400 recognized by the recognition processing unit S1110, the work instruction generation unit S1120 generates an instruction to perform work on the work subject A400. The calibration result storage unit D1130 stores information about the relative positional relationship between the camera and the robot. The work instruction generation unit S1120 sets the target position of the robot from the relative positional relationship information, and encodes the target position as a robot instruction. The work instruction generation unit S1120 transmits the encoded robot instruction to the robot control unit R210.

Range setting processing for the position and orientation of a work subject in the information processing apparatus R100 will be described in detail. Processing of setting the position/orientation range of a work subject to be recognized in the embodiment is executed offline before actual work. This processing can be implemented by calculation inside the computer A100 without connecting the image capturing unit R300 and robot system R200 to the information processing apparatus R100.

Figure 4:
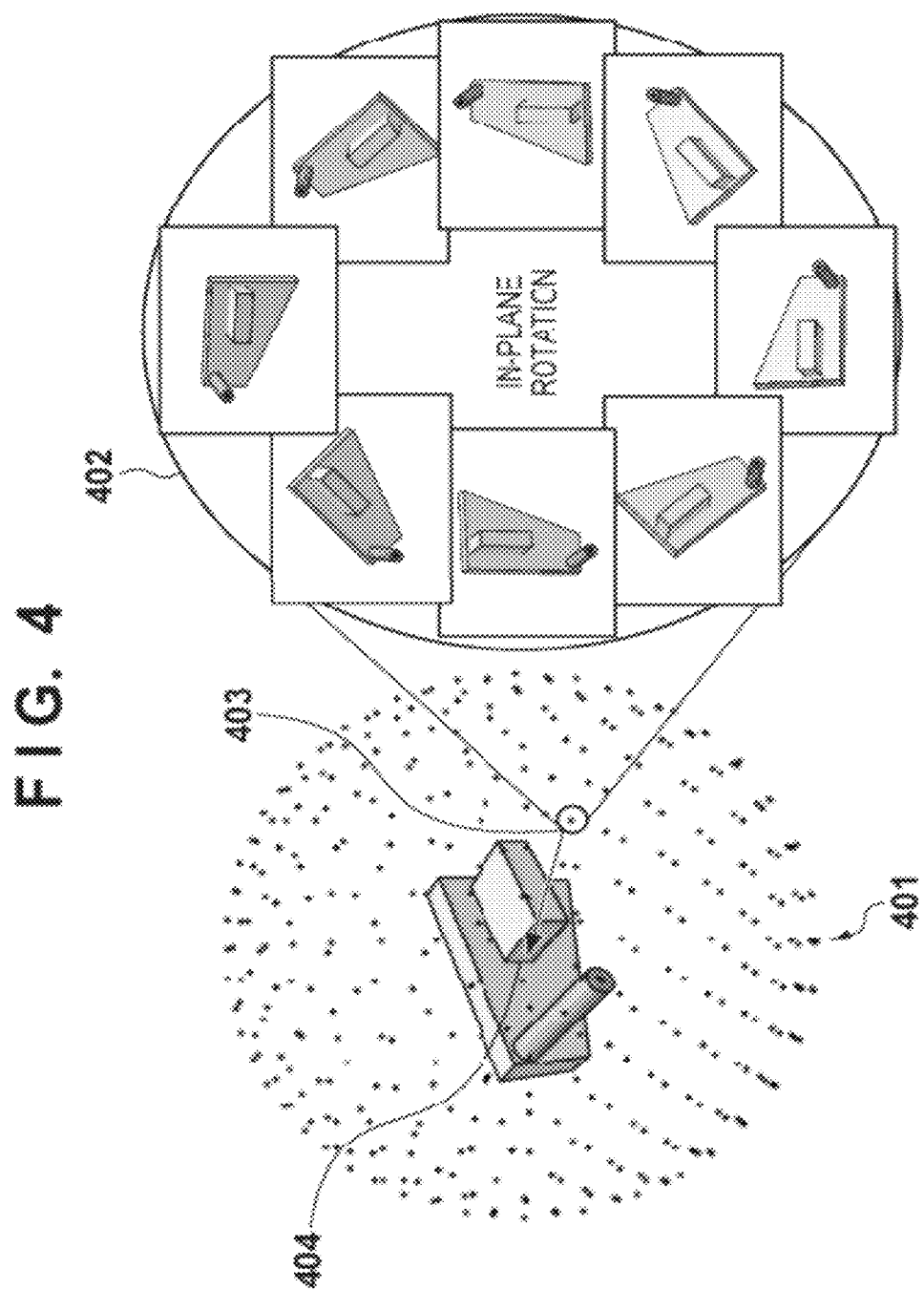
FIG. 4 is a view for explaining generation of an orientation pattern.
Figure 5:
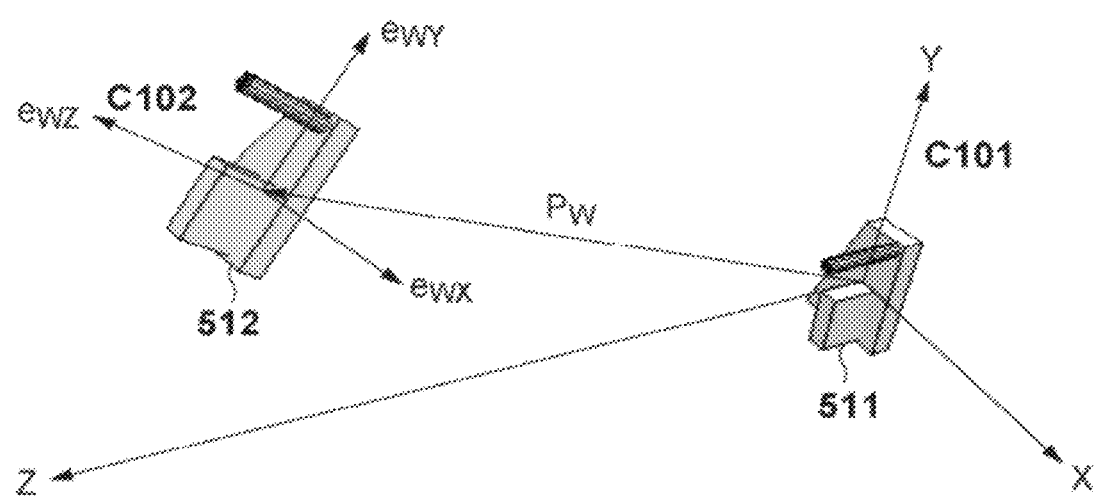
FIG. 5 is a view for explaining the expression of the position and orientation of a work subject.

First, the orientation setting unit S1010 generates the orientation set Θ={θ_j} (j=1, . . . , N) which may be handled by the recognizer. N is the total number of orientations which express all classes. Generation of the orientation set Θ will be explained with reference to FIG. 4. The three dimensional orientation set of the work subject A400 is generated by combining a geodesic dome 401 and in-plane rotation 402. The geodesic dome 401 is a well-known method of uniformly discretizing and expressing a spherical surface by recursively dividing triangular surface elements of a regular polyhedron into triangles of the same area. When the center of the geodesic dome 401 is regarded as a center 404 of the work subject, vertices of the regular polyhedron obtained from the geodesic dome 401 can be regarded as viewpoints 403 when looking down the work subject A400 from various positions. Variations of the appearance of the work subject A400 obtained from the respective viewpoints 403 in the geodesic dome 401 are accompanied by patterns of the in-plane rotation 402. For example, when rotation patterns are given to the geodesic dome 401 having 162 viewpoints in every Π/4 within the plane, the orientation set contains N=162×8=1296. In general, the position and orientation of a subject are expressed by a transformation for moving a model 511 to an observation value 512, as shown in FIG. 5. More specifically, the position can be expressed by a translation vector $P_W$ to a subject coordinate system C102 in a camera coordinate system C101. The orientation can be expressed by an orientation matrix $E_W=[e_{WX}, e_{WY}, e_{WZ}]$ based on a set of direction vectors along the respective axes of the subject coordinate system C102 in the camera coordinate system C101. The elements $e_{WX}, e_{WY},$ and $e_{WZ}$ of the orientation matrix $E_W$ are unit string vectors with a length of 1. Expression of the orientation of the recognizer need not consider the position, and the orientation matrix in the orientation $θ_j$ of a work subject is given by $E_{Wj}=[e_{WjX}, e_{WjY}, e_{WjZ}]$. The axes of the subject coordinate system are rotated within the plane using each viewpoint direction of the geodesic dome 401 as an axis, and the inclination of the viewpoint direction of the geodesic dome is added, obtaining the orientation matrix of each orientation. The generated orientation set Θ is sent to the obtaining unit S1060.

Figure 6:
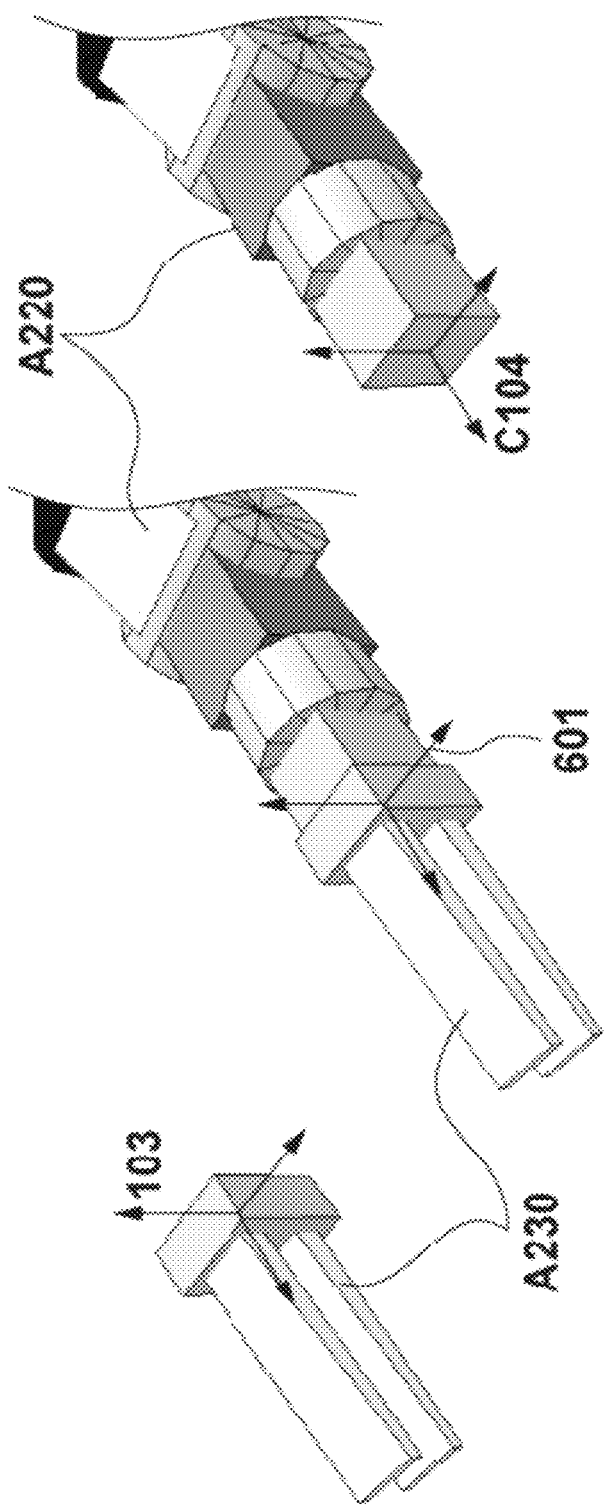
FIG. 6 is a view for explaining the relationship between the end effector coordinate system and the robot arm distal end coordinate system.

The work state setting unit S1020 sets the state of work on the work subject A400 by the end effector A230. The work state setting unit S1020 reads model data of the work subject A400 and data of the end effector A230 from the data storage unit D1030. The data storage unit D1030 stores in advance, as three dimensional model data, model data of the work subject A400 and data of the end effector A230. The physical coordinate system of the work subject A400 and the end effector coordinate system of the end effector A230 are set. FIG. 6 shows the relationship between an end effector coordinate system C103 and a robot arm distal end coordinate system C104. To simplify calculation of the position and orientation of the distal end of the robot arm (to be described later), the end effector coordinate system C103 may be set to coincide with the robot arm distal end coordinate system C104 in an end effector connection state 601 in which the end effector is connected to the robot arm. In the following description, the end effector coordinate system C103 and robot arm distal end coordinate system C104 coincide with each other upon connection. The user designates a state in which the end effector A230 performs predetermined work when the subject coordinate system C102 of the work subject A400 is set as a reference. The designation method does not depend on the interface format. For example, the user may adjust the state using a three dimensional display GUI or set it by inputting a numerical value.

Figure 7:
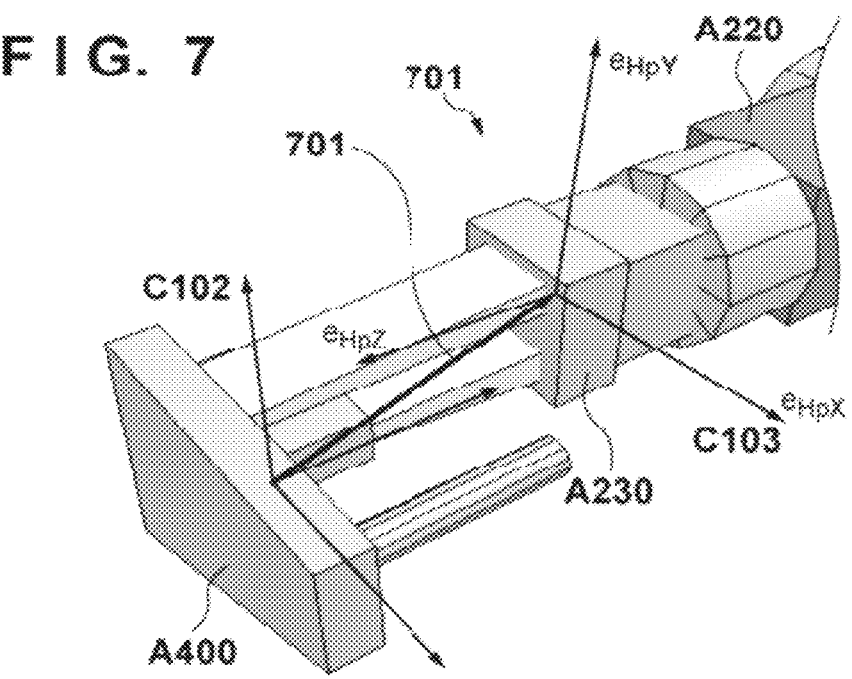
FIG. 7 is a view for explaining setting of a work state.

Setting of the work state will be explained with reference to FIG. 7. As a relative position 701 of the work subject A400 and end effector A230 in a set work state, $p=[X_p, Y_p, Z_p]^T$ is calculated as the position of the origin of the end effector coordinate system using the subject coordinate system C102 as a reference. The superscript "T" means the transpose of a matrix.

Also, the orientation matrix $E_{Hp}=[e_{HpX}, e_{HpY}, e_{HpZ}]$ of the end effector A230 using the subject coordinate system C102 as a reference is calculated as a relative orientation 702 of the work subject A400 and end effector A230. The calculated p and $E_{Hp}$ are sent to the obtaining unit S1060. The work state is determined by predetermined work contents. For example, when the work contents indicate gripping work with fingers, as shown in FIG. 2 or 7, the work state is expressed by the relative position and orientation of the work subject A400 and end effector A230 in a state in which the end effector A230 grips the work subject A400 with fingers at a gripping position. When the work contents indicate chucking work with a nozzle, which will be described later with reference to FIG.

9B, the work state is expressed by the relative position and orientation of the work subject A400 and end effector A230 in a state in which the chucking surface of the work subject A400 is chucked by the nozzle. The work contents are not limited to only a picking operation for the purpose of gripping or chucking the work subject A400. For example, the work contents may indicate fitting work to fit a fitting part A402 gripped by the end effector A230 as shown in FIG. 18A into a fitted part A401 as shown in FIG. 18B. In this case, the fitted part A401 can be regarded as the work subject A400, and the relative position and orientation of the end effector A230 and fitted part A401 in the fitting state as shown in FIG. 18B can be regarded as the work state. Work states to be set are not limited to one type. When a plurality of work states are possible, for example, when a work subject can be gripped at a plurality of angles, a plurality of work states can be designated. In this case, a plurality of relative positions p of the work subject A400 and end effector A230, and a plurality of end effector orientation matrices $E_{Hp}$ using the subject coordinate system C102 as a reference are set. If a relative approach path to the work subject A400 is determined in picking work, fitting work, or the like, its intermediate path may be additionally set as a work state. For example, in fitting work as in FIGS. 18A and 18B, when the fitted part A401 and fitting part A402 need to have a positional relationship as shown in FIG. 18A as a previous step to the fitting state shown in FIG. 18B, the state in FIG. 18A is set as an additional work state.

Figure 8:
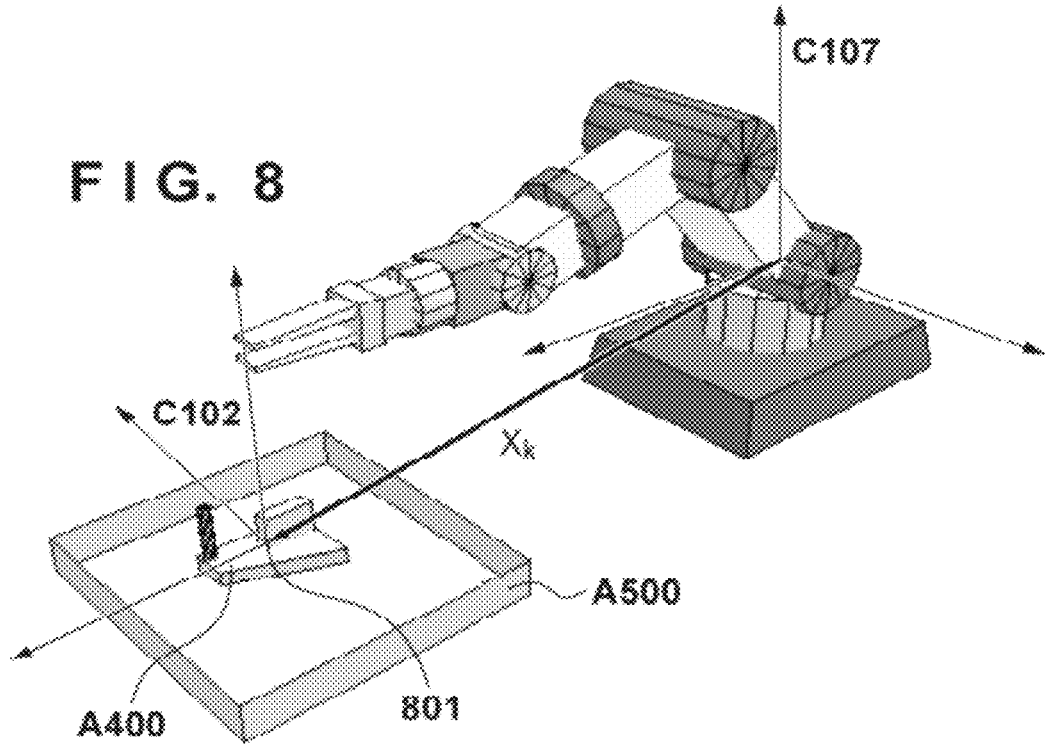
FIG. 8 is a view for explaining setting of a virtual position.

After that, the virtual position setting unit S1040 sets a virtual position in the work area. FIG. 8 explains the virtual position. The virtual position is an arbitrary position within the work area and is a position where the center of a part is arranged. The work area is a range where the work subject A400 is arranged before work, and is defined by, for example, the internal space of the tray A500. In some cases, the virtual position setting unit S1040 selects a plurality of virtual positions 801 by a plurality of times of loops, which will be described later. $X_k$ represents a virtual position 801 set by the kth setting, and is expressed using a robot coordinate system C107 as a reference. As an initial setting (k=1), virtual position $X_1$ is set at one point at an end of the work area, the center of gravity of the work area, or the like. The set $X_k$ is sent to the obtaining unit S1060.

Figure 9A:
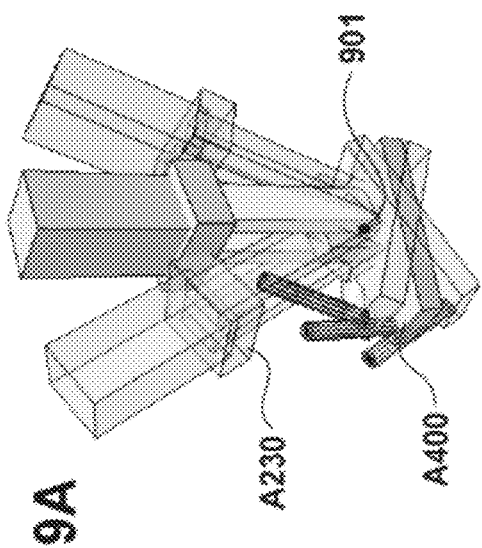
FIGS. 9A to 9C are views for explaining setting of an orientation pattern for determining workability.
Figure 9C:
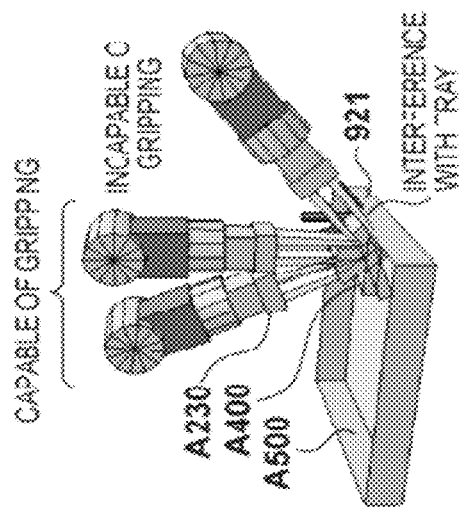
Figure 9B:
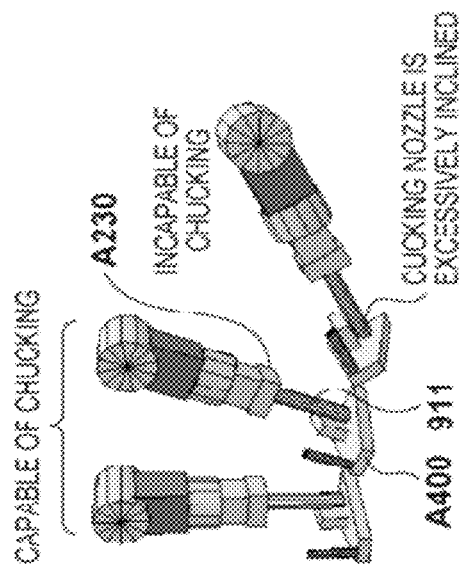

The obtaining unit S1060 obtains the orientation set $\Theta$ calculated by the orientation setting unit S1010, the relative position p and relative orientation $E_{Hp}$ set by the work state setting unit S1020, and the virtual position $X_k$ set by the virtual position setting unit S1040. Based on them, the obtaining unit S1060 calculates the orientation of the work subject A400 to be detected. The orientation of the work subject A400 to be detected is calculated considering a position and orientation in which the distal end (working unit) of the robot arm can work. Assume that the origin of the physical coordinate system of the work subject A400 is arranged at the virtual position $X_k$. A case is examined in which the orientation of the work subject A400 is set to $\theta_j$ while fixing an origin 901 of the physical coordinate system, as shown in FIG. 9A. The orientation $\theta_j$ to be determined includes all orientations defined by $\Theta$ in general. However, the orientation $\theta_j$ may be restricted in advance using known environmental information such as restrictions on the arrangement of the work subject A400, the characteristics of the end effector A230, and the tray arrangement. For example, when the arrangement of the work subject A400 in the work area is determined to a certain degree by a part feeder or the like, the orientation $\theta_j$ to be determined may be restricted within the range. Alternatively, when the end effector is a chucking one using a nozzle 911, as shown in FIG. 9B, and the orientation range where the end effector can chuck the work subject A400 is experimentally known, the orientation $\theta_j$ to be determined may be restricted within the range. When the position of the tray A500 in the work area is known, an orientation in which a tray wall surface 921 and the end effector A230 interfere with each other with respect to the virtual position $X_k$, as shown in FIG. 9C, may be excluded in advance from orientations to be determined.

Whether the robot arm R220 can work in the orientation $\theta_j$ to be determined is determined by solving inverse kinematics of the robot arm to determine whether the position and orientation of the distal end (working unit) of the robot arm allow work in terms of the robot structure. Although the analytic solution of inverse kinematics depends on the robot structure, it will be explained on the premise of an RPP-RPR six-axis multi-joint robot. Note that R is a rotational joint and P is a prismatic joint.

Figure 10:
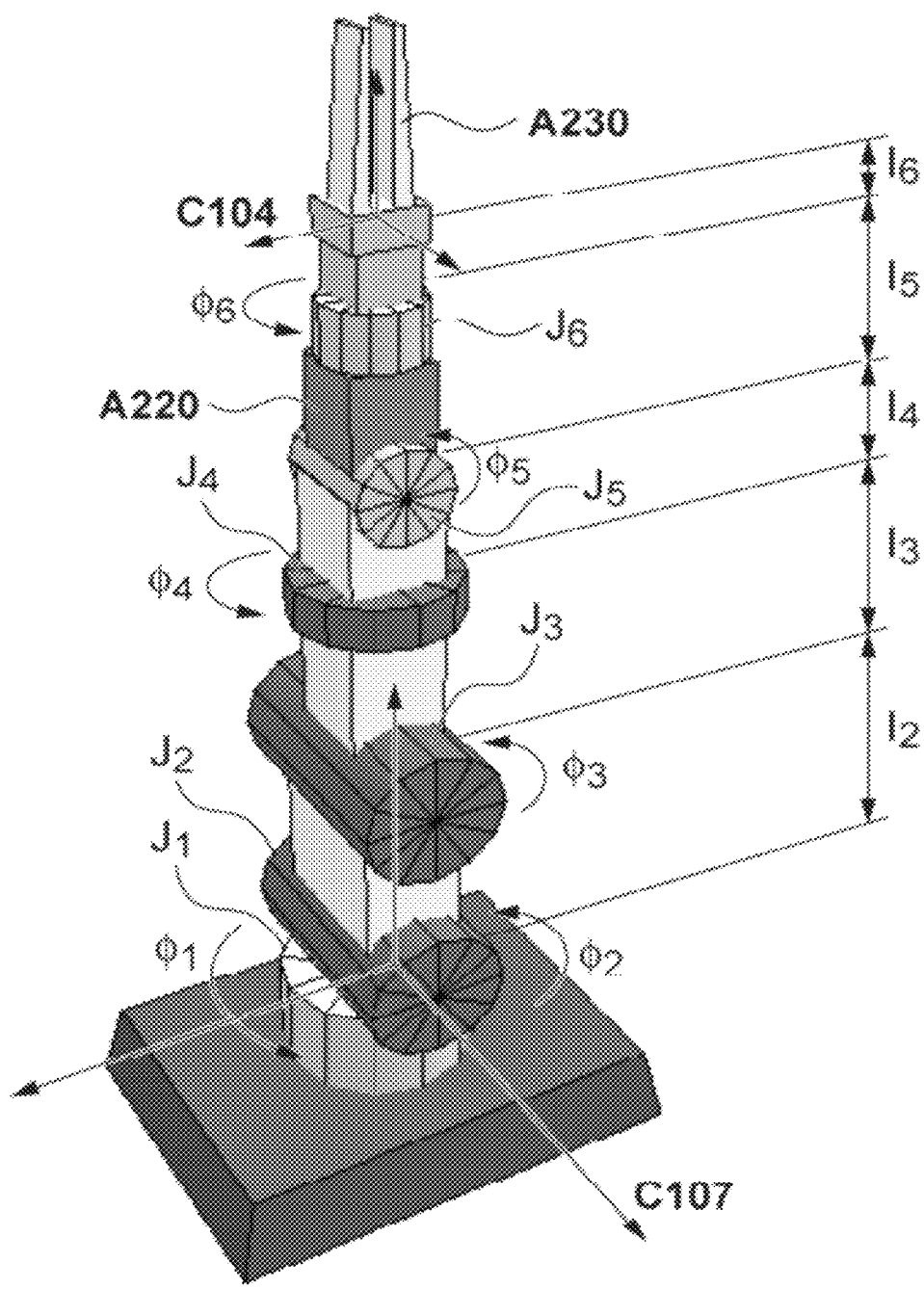
FIG. 10 is a view exemplifying a six-axis multi-joint robot arm.

FIG. 10 is a view for explaining the structure of the RPP-RPR robot. Assume that the robot coordinate system C107 coincides with the coordinate system of a joint $J_1$. For each joint $J_i$, the link length between $J_i$ and $J_{i+1}$ is defined as $l_i$. Note that the length from the joint $J_6$ to the distal end of the robot arm is $l_6$. Assume that $J_1$ and $J_2$ are at the same position and $l_1$=0. $\phi_i$ is the right-handed rotation angle of the joint $J_i$, and a state in which all $\phi_i$ are 0 rad is defined as the initial state of the robot arm R220. The limit values of the link length and joint rotation angle are known values determined by design values as characteristic parameters of the robot arm R220, and are read from the robot parameter storage unit D1050.

In general, the rotation angles of rotational joints ($\phi_1$, $\phi_4$, and $\phi_6$ in this example) do not have a limit value (or even if they have limit values, their ranges are wide). However, prismatic joints ($\phi_2$, $\phi_3$, and $\phi_5$ in this example) often have narrow angle ranges owing to physical limitations posed by interference with adjacent links. The orientation matrix of each joint $J_i$ is given by $E_i = [e_{iX}, e_{iY}, e_{iZ}]$ and is defined such that the orientation matrix $E_i$ in the initial state of the robot arm becomes a unit matrix. The position of the joint $J_i$ in the robot coordinate system is expressed by $Q_i = [X_i, Y_i, Z_i]^T$. Solving inverse kinematics equals calculating each joint angle $\phi_i$ when the position and orientation of the distal end (working unit) of the robot arm are determined. Letting $Q_T = [X_T, Y_T, Z_T]^T$ be the position of the distal end (working unit) of the robot arm and $E_T = [e_{TX}, e_{TY}, e_{TZ}]$ be the orientation, two values are obtained as solutions of $\phi_1$ in accordance with equations (1):

$$\phi_1 = \begin{cases} \text{ATAN2}(Y_5, X_5) \\ \text{ATAN2}(Y_5, X_5) + \pi \end{cases} \quad (1)$$

where ATAN 2 (a, b) is an arc tangent function which gives $\theta$ satisfying equations (2):

$$\sin\theta = \frac{a}{\sqrt{a^2 + b^2}}, \quad (2)$$

$$\cos\theta = \frac{b}{\sqrt{a^2 + b^2}}$$

Further, the values of $\phi_2$ and $\phi_3$ are obtained independently of $\phi_1$ in accordance with equations (3) and (4):

$$\phi_2 = \alpha \mp \beta \quad (3)$$

$$\phi_3 = \pm(\gamma + \beta) \quad (4)$$

Note that equations (3) and (4) take the double sign in the same order. $\alpha$, $\beta$, and $\gamma$ are given by equations (5), (6), and (7):

$$\alpha = \text{ATAN2}\left(\sqrt{X_5^2 + Y_5^2}, Z_5\right) \quad (5)$$

$$\cos\beta = \frac{l_2^2 + \|Q_5\|^2 - (l_3 + l_4)^2}{2 l_2 \|Q_5\|} \quad (6)$$

$$\cos\gamma = \frac{(l_3 + l_4)^2 + \|Q_5\|^2 - l_2^2}{2(l_3 + l_4)\|Q_5\|} \quad (7)$$

The position $Q_5$ of the joint $J_5$ can be calculated from equation (8):

$$Q_5 = Q_T - (l_5 + l_6) e_{TZ} \quad (8)$$

The joint angle $\phi_4$ is an angle defined by the $J_3$ axis and $J_5$ axis, and is obtained by equation (9):

$$\phi_4 = \text{ATAN 2}(e_{3Y} \cdot e_{5Y}, (e_{3Y} \times e_{5Y}) \cdot e_{3Z}) \quad (9)$$

where • is the inner product of vectors and × is the outer product of vectors. The vectors $e_{3Y}$, $e_{3Z}$, and $e_{5Y}$ can be obtained from equations (10), (11), and (12):

$$e_{3Y} = [-\sin\phi_1, \cos\phi_1, 0]^T \quad (10)$$

$$e_{3Z} = \frac{Q_5 - Q_3}{l_3 + l_4} \quad (11)$$

$$e_{5Y} = \pm \frac{e_{3Z} \times e_{TZ}}{\|e_{3Z} \times e_{TZ}\|} \quad (12)$$

Note that the joint angles $\phi_3$ and $\phi_5$ are obtained from equations (13) and (14):

$$Q_3 = l_2 [\sin\phi_2 \cos\phi_1, \sin\phi_2 \sin\phi_1, \cos\phi_2]^T \quad (13)$$

$$\phi_5 = \text{ATAN 2}((e_{3Z} \times e_{TZ}) \cdot e_{5Y}, e_{3Z} \times e_{TZ}) \quad (14)$$

The joint angle $\phi_6$ is obtained from equation (15):

$$\phi_6 = \text{ATAN 2}((e_{5Y} \times e_{6Y}) \cdot e_{5Z}, e_{5Y} \times e_{6Y}) \quad (15)$$

Since no prismatic joint exists between the joint $J_5$ and the distal end of the robot arm and the orientation matrices $E_5$ and $E_T$ are equal, equation (16) holds:

$$e_{5Z} = e_{TZ} \quad (16)$$

Similarly, since no prismatic joint exists between the joint $J_6$ and the distal end of the robot arm and the orientation matrices $E_6$ and $E_T$ are equal, equation (17) holds:

$$e_{6Y} = e_{TY} \quad (17)$$

From sign inversion of equation (12), each of $\phi_4$, $\phi_5$, and $\phi_6$ has two solutions because of the double sign in the same order. Therefore, a combination of $\phi_1$ to $\phi_6$ has eight solutions for one robot arm distal end position $Q_T$ and one orientation $E_T$.

A case in which the orientation of the work subject A400 is $\theta_j$ when the center of the work subject A400 in the subject coordinate system C102 is set at $X_k$ in the robot coordinate system C107 will be examined. The position $Q_H$ of the end effector A230 in the robot coordinate system C107 is obtained from the orientation matrix $E_j$ and the relative position vector p of the work subject A400 and end effector A230 in accordance with equation (18):

$$Q_H = X_k + E_j p \quad (18)$$

Further, an end effector orientation matrix $E_H$ using the robot coordinate system C107 as a reference can be obtained from equation (19):

$$E_H = E_{Hp} E_j \quad (19)$$

As defined above, when the robot arm distal end coordinate system C104 coincides with the end effector coordinate system C103, $Q_T = Q_H$ and $E_T = E_H$. From this, a joint angle for the position $X_k$ and orientation $\theta_j$ of the work subject A400 can be analytically obtained. From equation (6), whether the solution of $\phi_2$ can be obtained can be determined based on whether the value of $\cos\beta$ falls within $[-1, 1]$. Also from equations (6) and (7), whether the solution of $\phi_3$ can be obtained can be determined. If the obtained values of $\phi_1$ to $\phi_6$ do not fall within the design movable range of the robot arm A220, it is determined that they fall outside the movable range. If $\phi_1$ to $\phi_6$ within the design movable range of the robot arm are obtained as a result of the determination, they are considered to satisfy the joint conditions. It can therefore be determined that when the work subject A400 exists at the position $X_k$ and takes the orientation $\theta_j$, the distal end (working unit) of the robot arm can work. If the work state setting unit S1020 sets a plurality of work states, inverse kinematics for p and $E_{Tp}$ in each work state are calculated for the virtual position $X_k$ and orientation $\theta_j$. If there is even one orientation in which the distal end (working unit) of the robot arm can work, it is determined that they can work in the orientation $\theta_j$ at the virtual position $X_k$. The above-described solution of inverse kinematics changes depending on a combination of joints of the robot arm. A description of a solution to a robot arm having another arrangement will be omitted, and the solution is not limited to one for a robot arm having the above-mentioned arrangement.

Figure 21:
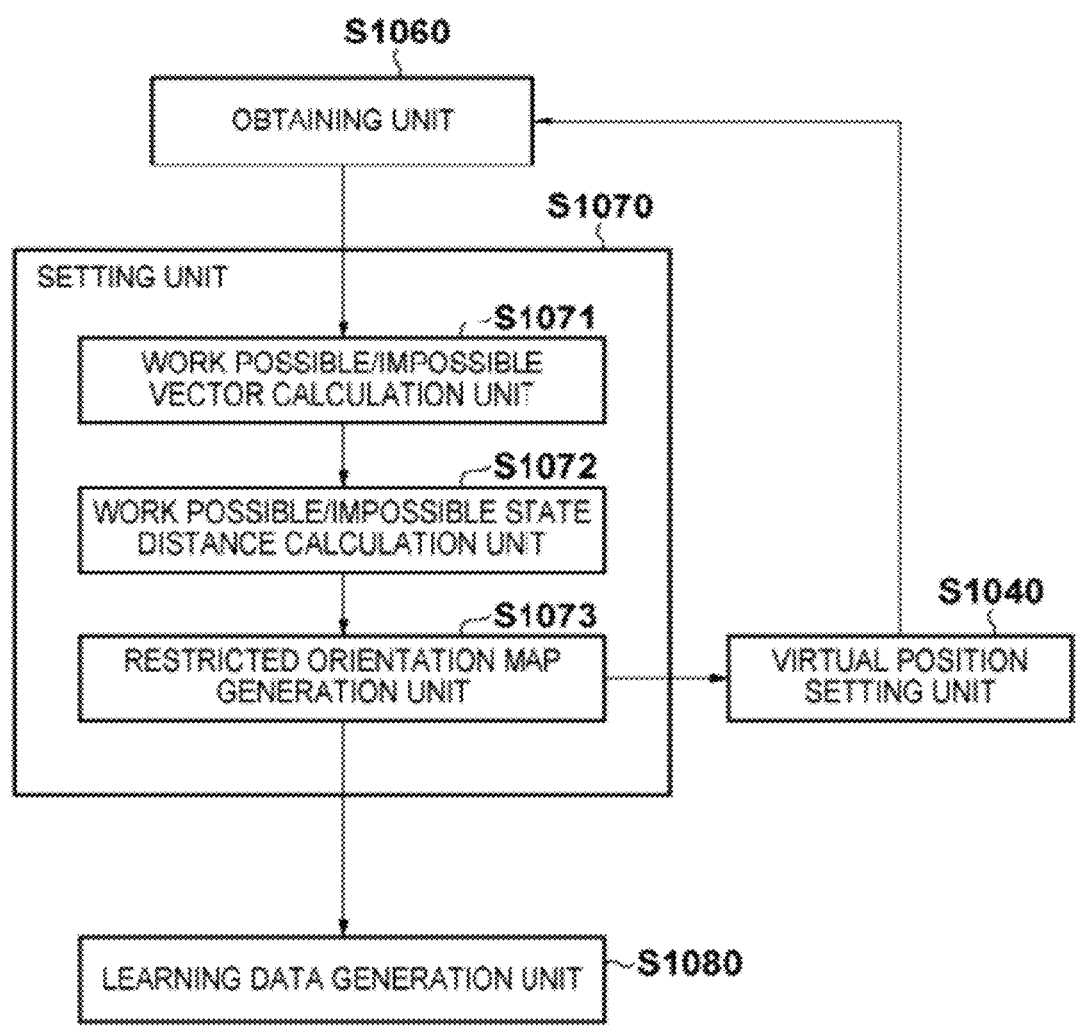
FIG. 21 is a flowchart showing a processing sequence in a setting unit.

Based on workability in each orientation calculated by the obtaining unit S1060, the setting unit S1070 sets restricted orientations necessary to generate a recognizer, and sets the position/orientation range of the work subject A400. A processing sequence in the setting unit S1070 will be explained with reference to FIG. 21.

First, a work possible/impossible vector calculation unit S1071 functioning as a determination means and work information calculation means sets a restricted orientation and calculates a work possible/impossible vector based on the restricted orientation (work information calculation processing). An orientation $\theta_j$ for which the obtaining unit S1060 has determined that the distal end (working unit) of the robot arm can work at the virtual position $X_k$ is set as a restricted orientation at the virtual position $X_k$. Based on this, a work possible/impossible vector $F_k$ (Nth-order vector) to the virtual position $X_k$ is defined. The jth element $F_{kj}$ of the work possible/impossible vector $F_k$ is defined such that $F_{kj}=1$ when the orientation $\theta_j$ is a restricted orientation; otherwise, $F_{kj}=0$. That is, the work possible/impossible vector $F_k$ expresses the presence/absence of a restricted orientation at the virtual position $X_k$ by a binary vector. When the angle of view of the camera A300 in the work area on an image is too narrow to ignore the perspective, the virtual position setting unit S1040 may set only one virtual position $X_k$ (k=1), and the obtained work possible/impossible vector $F_1$ may be set as a position/orientation range to be obtained. When the work area is captured at a wide angle of view, the position/orientation range to be obtained may change depending on the position within the frame. In this case, first, the virtual position setting unit S1040 sets a plurality of types of virtual positions $X_k$ of the work subject A400 within the work area. Then, the virtual position setting unit S1040 calculates the work possible/impossible vector $F_k$ at each virtual position $X_k$ in accordance with the determination result of each orientation by the obtaining unit S1060.

Figure 11A:
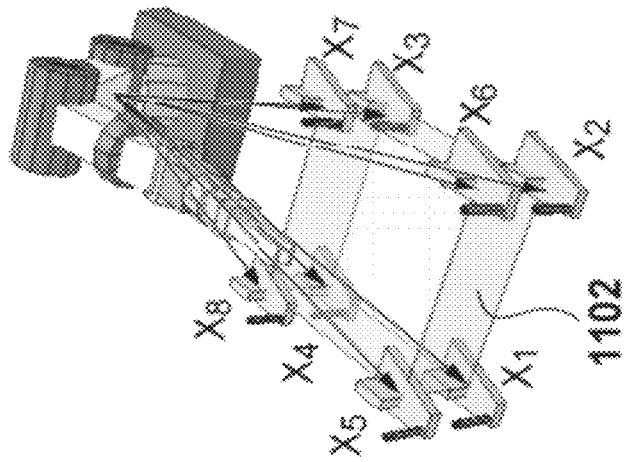
FIGS. 11A and 11B are views exemplifying a case in which a plurality of virtual positions are set.
Figure 11B:
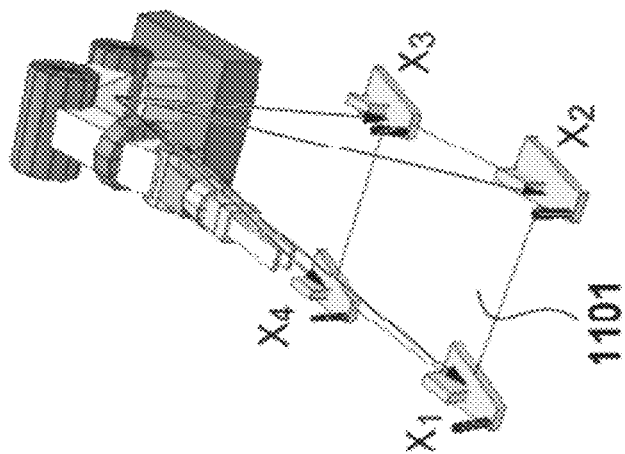

Initial virtual positions $X_k$ are set roughly. For example, $X_1$ to $X_4$ may be set at four corners of a work area 1101, as shown in FIG. 11A. When the height of a pile of the work subjects A400 varies greatly so that the perspective by height cannot be ignored, a work area 1102 may be defined as a cubic area, and $X_1$ to $X_8$ may be defined at eight vertices, as shown in FIG. 11B.

Figure 12A:
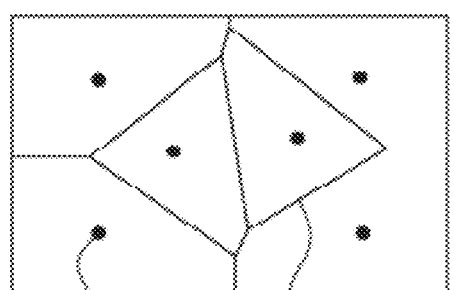
FIGS. 12A to 12C are views for explaining generation of a restricted orientation map.

As shown in FIG. 12A, a Voronoi boundary 1211 is set using, as centers, a plurality of virtual positions $801X_k$ projected within a work area set in a space in the image coordinate system, and divides the work area into a plurality of areas (area division processing). The Voronoi boundary is an area boundary obtained when the area is divided on the assumption that an arbitrary point X belongs to $X_k$ nearest to the point X.

Figure 12B:
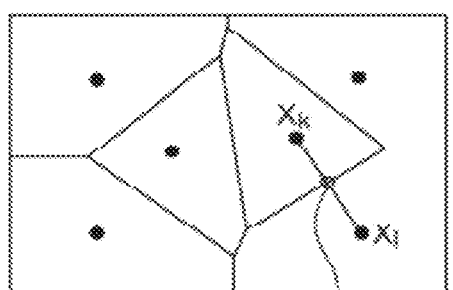

A work possible/impossible state distance calculation unit S1072 functioning as a determination means, work information calculation means, and area division means calculates a work possible/impossible state distance as the difference work possible/impossible vectors between respective positions. When two virtual positions $X_k$ and $X_l$ are adjacent to each other via the above-described Voronoi boundary, the Hamming distance between the work possible/impossible vectors $F_k$ and $F_l$ at the virtual positions $X_k$ and $X_l$ is calculated and defined as a work possible/impossible state distance. When the work possible/impossible state distance between $F_k$ and $F_l$ is nonzero, the distance between the virtual positions $X_k$ and $X_l$ in the image coordinate system is measured. The virtual position setting unit S1040 newly adds and sets a virtual position if the distance is larger than an image search width (one pixel generally). It suffices to set a new virtual position 1221 at a middle point between $F_k$ and $F_l$, as shown in FIG. 12B. The obtaining unit S1060 determines workability, and a work possible/impossible vector is newly generated. After repeating this processing, if the distance between two points having a nonzero work possible/impossible state distance in the image coordinate system is equal to or smaller than the image search width for all existing virtual positions, virtual position addition processing ends.

Figure 12C:
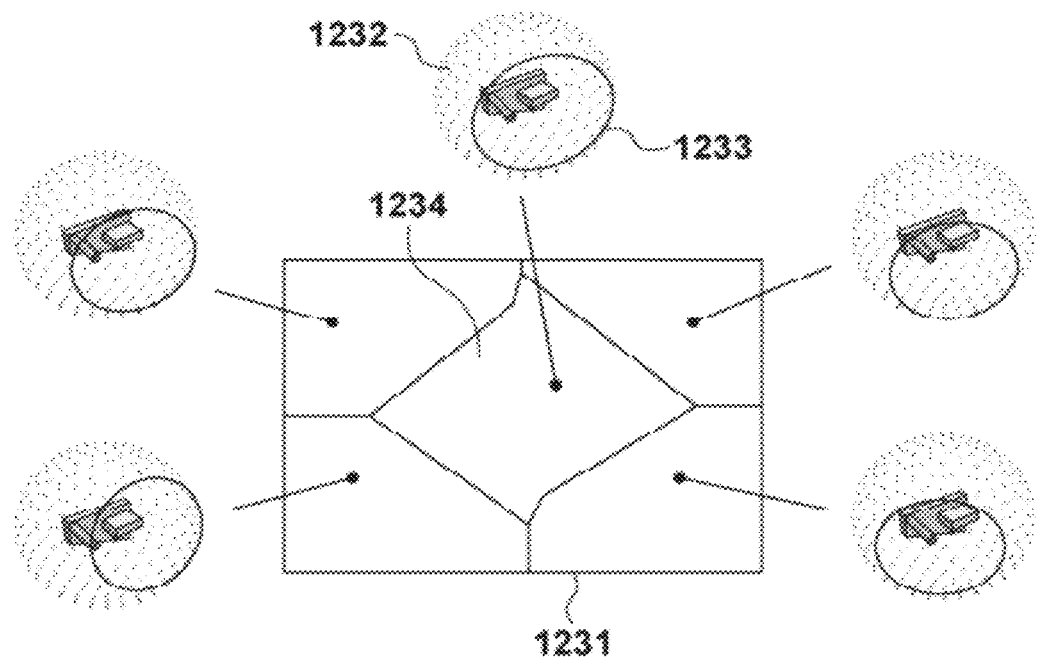

A restricted orientation map generation unit S1073 functioning as a generation means assigns the same index to areas having the same work possible/impossible vector based on the results obtained by the work possible/impossible state distance calculation unit S1072, and integrates them as an identical area. Accordingly, a restricted orientation map 1231 for respective positions at image coordinates is generated, as shown in FIG. 12C. The restricted orientation map indicates position/orientation ranges in the work area, and represents the work possible/impossible information distribution. FIG. 12C exemplifies a restricted orientation map obtained by dividing the work area into a plurality of areas 1234. Although a geodesic dome 1232 schematically shows a restricted orientation range 1233, the range is determined including even in-plane rotation in practice. When there is only one virtual position, the restricted orientation map 1231 having the same restricted orientation in the entire work area is generated. Learning data is generated from the thus-obtained restricted orientation map, generating a recognizer used in actual work.

Figure 13:
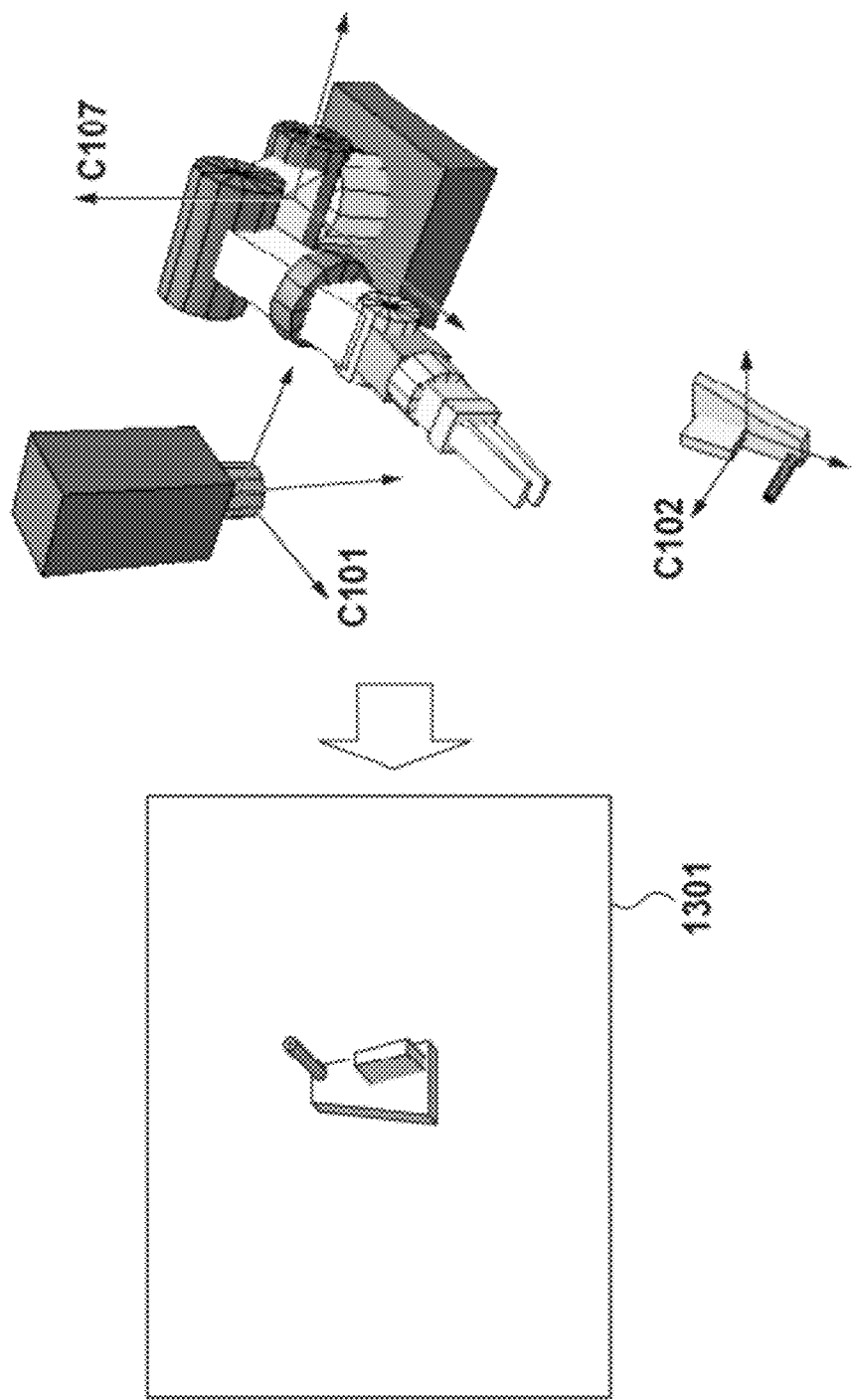
FIG. 13 is a view for explaining a process of generating a CG image as learning data.

The learning data generation unit S1080 generates learning data of the work subject A400 in a restricted orientation. The learning data is created based on a three dimensional model. FIG. 13 shows generation of a learning image. A projection matrix to the image plane when the work subject A400 takes the restricted orientation $\theta_j$ is obtained from the relative positional relationship between the robot coordinate system C107 and the camera coordinate system C101. For this reason, learning data 1301 can be generated by an existing computer graphics technique using three dimensional model data stored in the data storage unit D1030, and the calibration result between the robot and the camera that is stored in the calibration result storage unit D1130. Although learning data is explained as an image in FIG. 13, it essentially depends on an input data format used in the recognizer and is not limited to an image. For example, in recognition based on a depth map using a distance sensor, the depth is calculated from three dimensional model data to generate a depth map as learning data. The calibration result stored in the calibration result storage unit D1130 includes a transformation matrix representing the relative positional relationship between the robot coordinates and the camera coordinates, a camera lens distortion parameter, and a projection matrix for representing the correspondence between the camera coordinates and the image coordinates. These calibration methods suffice to be known methods, and a detailed description thereof will be omitted.

The recognizer generation unit S1090 generates a recognizer using learning data generated by the learning data generation unit S1080. Recognizers having different restricted orientations for respective areas of the restricted orientation map may be generated. Alternatively, restricted orientations in which the distal end (working unit) of the robot arm can work in all work areas may be selected to generate recognizers. At this time, the number of classes serving as estimated orientation variations in generated recognizers equals the number of orientations obtained as restricted orientations.

The recognizer can adopt any existing method, and the present invention is not limited by any method. For example, the recognizer may be an identifier using a well-known technique such as SVM (Support Vector Machine) or Randomized Tree. For example, when the recognizer employs SVM, positions and orientations to be obtained are restricted, decreasing the number of classes to be learned. In this case, the number of learning data used for learning decreases, and a higher learning speed can be expected. Since the class identification boundary decreases, a smaller number of support vectors can be expected and a sparser expression becomes possible. Hopes are high for a smaller-size recognizer, and a higher detection speed and higher detection accuracy in actual work.

When generating recognizers separately for the respective areas 1234 on the restricted orientation map 1231, learning data of restricted orientations in which the distal end (working unit) of the robot arm can work in the respective areas are selected from learning data generated by the learning data generation unit S1080, and recognizers are generated for the respective areas. For example, when the restricted orientation combination pattern is divided into five areas, as shown in FIG. 12C, five recognizers are generated using learning data of restricted orientations corresponding to the respective five areas.

When selecting a restricted orientation in which the distal end (working unit) of the robot arm can work in all work areas, for example, in the case of FIG. 12C, restricted orientations in all areas are ANDed, obtaining an orientation in which they can work in all work areas. Then, one recognizer is generated using learning data about a restricted area obtained by ANDing of all areas. A recognizer generated by the recognizer generation unit S1090 is stored in the recognizer storage unit D1100. After that, offline processing ends.

Next, online processing will be explained. In online actual work, the recognition processing unit S1110 first sends an image capturing signal to the image capturing unit R300 to capture an image of the work area. The captured image data is then transmitted to the recognition processing unit S1110. The recognition processing unit S1110 recognizes the position and orientation of the work subject A400 using a recognizer stored in the recognizer storage unit D1100. When recognizers are prepared for respective areas, a recognizer is selected based on an image coordinate position in search. The position and orientation of the work subject A400 that are recognized by the recognition processing unit S1110 are sent to the work instruction generation unit S1120.

Based on the estimated position and orientation of the work subject A400 that have been obtained from the recognition processing unit S1110, the work instruction generation unit S1120 generates an instruction to perform work on the work subject A400. The target position of the robot is set in accordance with the relative positional relationship between the camera and the robot that has been obtained from the calibration result storage unit D1130. The target position is encoded as a robot instruction. The encoded robot instruction is transmitted to the robot control unit R210.

The robot control unit R210 decodes the instruction received from the work instruction generation unit S1120 to operate the robot arm R220 and perform work on the work subject A400 by the robot system.

According to the first embodiment, orientations of a work subject to be recognized can be restricted based on the workability of the robot arm for a work subject having a high degree of freedom of the orientation. The embodiment can therefore reduce the memory capacity of a recognizer used in actual work, shorten the recognition processing time when detecting a target subject, and expect higher recognition accuracy.

Second Embodiment

Learning data generated by the learning data generation unit S1080 is data generated from three dimensional model data in the first embodiment, but learning data in the present invention is not limited to this. Learning data generated by the learning data generation unit S1080 may be an image actually captured using the image capturing unit R300. An apparatus arrangement when generating learning data by actual image capturing will be described with reference to FIG. 14.

The arrangement and processing contents other than a learning data generation unit S1080 and learning image storage unit D1140 are the same as those in the first embodiment, and a description thereof except for these processing units will not be repeated.

The learning data generation unit S1080 obtains actually captured images $l^v$ of a work subject that are obtained in advance at a plurality of viewpoints v (v=1, . . . , V) toward the work subject by using an image capturing unit R300. The learning data generation unit S1080 stores the images $l^v$ in the learning image storage unit D1140. The image capturing interval between a plurality of viewpoints v is set smaller than the granularity of an orientation pattern generated by an orientation setting unit S1010. When obtaining these work subject images, the image capturing unit R300 preferably has the same settings as those in online actual work, but need not always have them.

After obtaining images, the learning data generation unit S1080 first obtains the three dimensional model of a work subject A400 from a data storage unit D1030 which stores CAD data. Based on the three dimensional model, the learning data generation unit S1080 associates image coordinates on a learning image obtained from each viewpoint with camera coordinates. By matching processing manually or using a tracking tool based on a well-known technique, the learning data generation unit S1080 calculates the position and orientation, in the camera coordinate space, of the work subject on the learning image $l^v$ read out from the learning image storage unit D1140. Accordingly, the position $X_V$ and orientation $\theta_v$ of the work subject A400 on the learning image in the camera coordinate space are obtained. By perspectively projecting CAD data, a work subject area on the image is obtained. The position of the work subject A400 on the image with respect to the center of the subject coordinate system C102 is normalized. The area of the work subject A400 is extracted and used as a learning image.

For the obtained learning image data, an image $l^v$ in an orientation closest to a restricted orientation $\theta_j$ calculated by a setting unit S1070 is handled as a learning image in the orientation $\theta_j$. At this time, $\theta_j$ is updated as $\theta_v$. A recognizer generation unit S1090 performs learning for a recognizer using the assigned learning image as learning data.

According to the second embodiment, orientations of a work subject to be recognized can be restricted based on the workability of the robot arm for a work subject having a high degree of freedom of the orientation. The embodiment can reduce the memory capacity of a recognizer used in actual work, shorten the recognition processing time when detecting a target subject, and expect higher recognition accuracy.

Third Embodiment

Unlike the first and second embodiments, the third embodiment is not limited to an arrangement in which all processes by an obtaining unit S1060 are executed by calculation inside a computer A100. Processes by the obtaining unit S1060 may be implemented by actually operating a robot arm R220.

Figure 19:
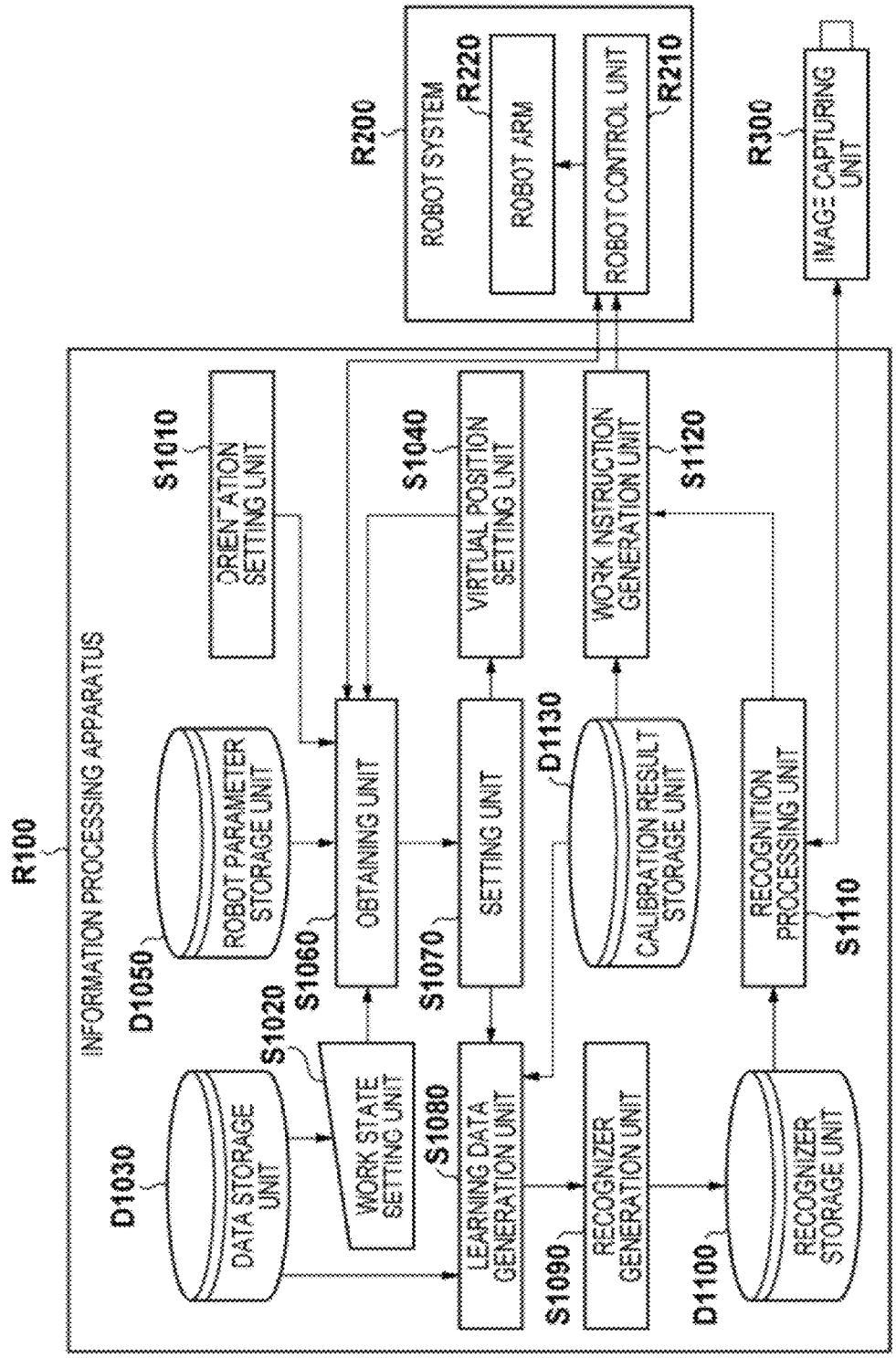
FIG. 19 is a block diagram for explaining the arrangement of apparatuses in a system according to the third embodiment.

FIG. 19 shows the functional arrangement of an information processing apparatus R100 when obtaining a position/orientation range by actually operating the robot arm R220. The functions of processing units except for the obtaining unit S1060 are the same as those in the first or second embodiment, and a description thereof except for the obtaining unit S1060 will not be repeated.

The obtaining unit S1060 calculates the orientation of a work subject A400 to be detected, based on the orientation set Θ set by an orientation setting unit S1010, the relative position p and relative orientation $E_{Hp}$ set by a work state setting unit S1020, and the virtual position $X_k$ set by a virtual position setting unit S1040. The orientation of the work subject A400 to be detected is calculated considering a position and orientation in which the distal end (working unit) of the robot arm can work.

Assume that the origin of the physical coordinate system of the work subject A400 is arranged at the virtual position $X_k$. Letting $E_j$ be the orientation matrix of the orientation $\theta_j$ for which it is determined whether the distal end (working unit) of the robot arm can work, the target position $Q_T$ and target orientation $E_T$ of the distal end (working unit) of the robot arm in the robot coordinate system are given by equations (20) and (21), respectively:

$$Q_T = X_k + E_j p \tag{20}$$

$$E_T = E_{Hp} E_j \tag{21}$$

The obtaining unit S1060 sends an instruction to a robot control unit R210 to operate the robot arm R220 to the target position $Q_T$ and target orientation $E_T$. When the robot control unit R210 has successfully moved the robot arm R220 to the target position $Q_T$ and target orientation $E_T$, the obtaining unit S1060 determines that the orientation $\theta_j$ is a workable orientation. To the contrary, when the robot control unit R210 has failed in moving the robot arm R220 to the target position $Q_T$ and target orientation $E_T$, that is, when an error occurs during movement of the robot arm, the obtaining unit S1060 determines that $\theta_j$ is an unworkable orientation.

According to the third embodiment, orientations of a work subject to be recognized can be restricted based on the workability of the robot arm for a work subject having a high degree of freedom of the orientation. The embodiment can reduce the memory capacity of a recognizer used in actual work, shorten the recognition processing time when detecting a target subject, and expect higher recognition accuracy.

Fourth Embodiment

Figure 15A:
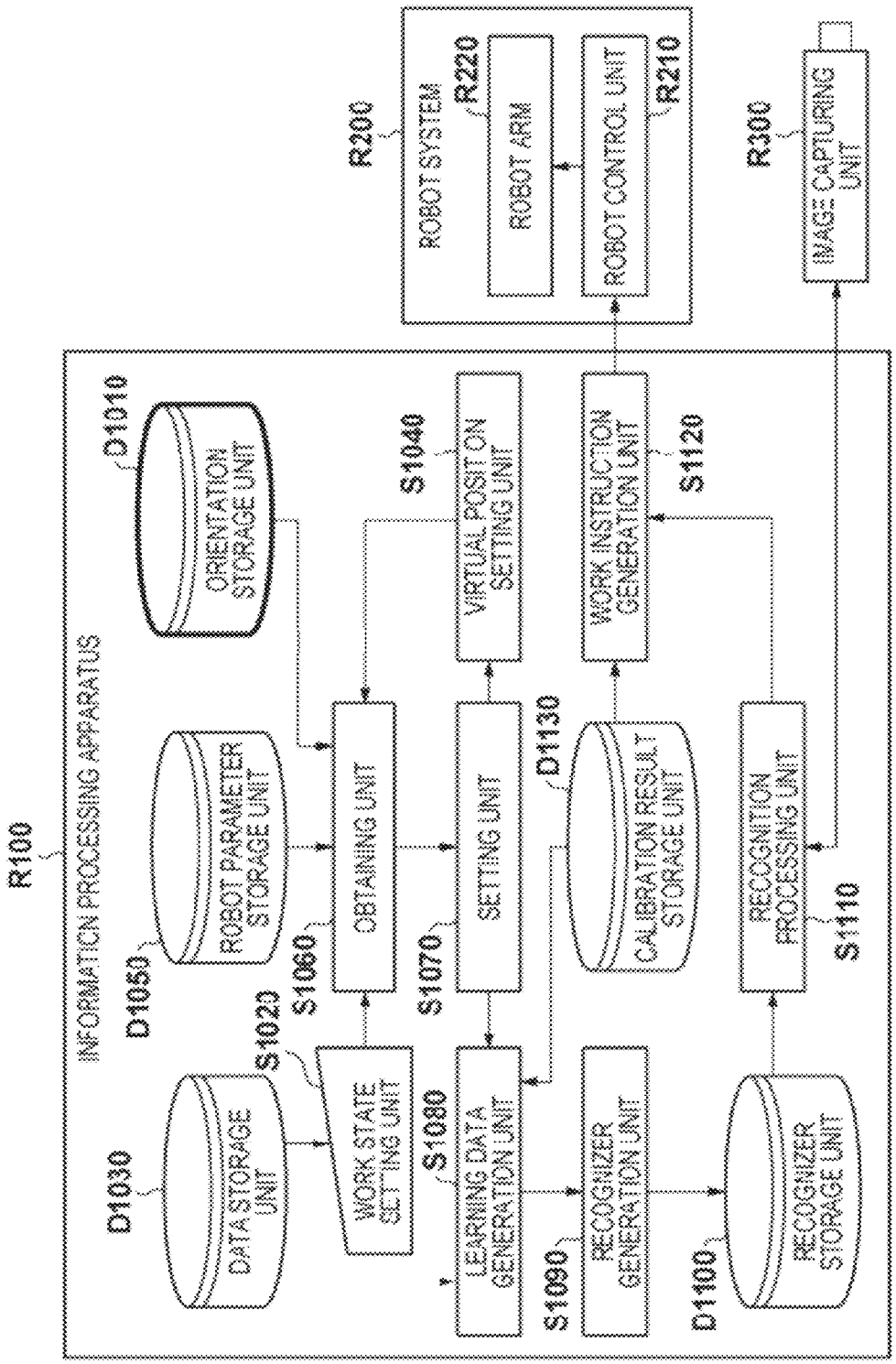

The present invention is not limited to the arrangement described in the first embodiment, and can take various arrangements. An orientation need not always be calculated in processing by the orientation setting unit S1010 in the first embodiment. For example, an orientation storage unit D1010 may replace the orientation setting unit S1010 as in an arrangement shown in FIG. 15A. In this case, the orientation storage unit D1010 stores a predetermined orientation set, and an obtaining unit S1060 reads out the orientation set from the orientation storage unit D1010.

Similarly, a virtual position need not always be calculated in processing by the virtual position setting unit S1040 in the first embodiment. For example, a virtual position storage unit D1040 may replace the virtual position setting unit S1040 as in an arrangement shown in FIG. 15B. In this case, the virtual position storage unit D1040 stores a plurality of virtual positions set in advance, and the obtaining unit S1060 reads out a virtual position from the virtual position storage unit D1040.

Figure 15C:
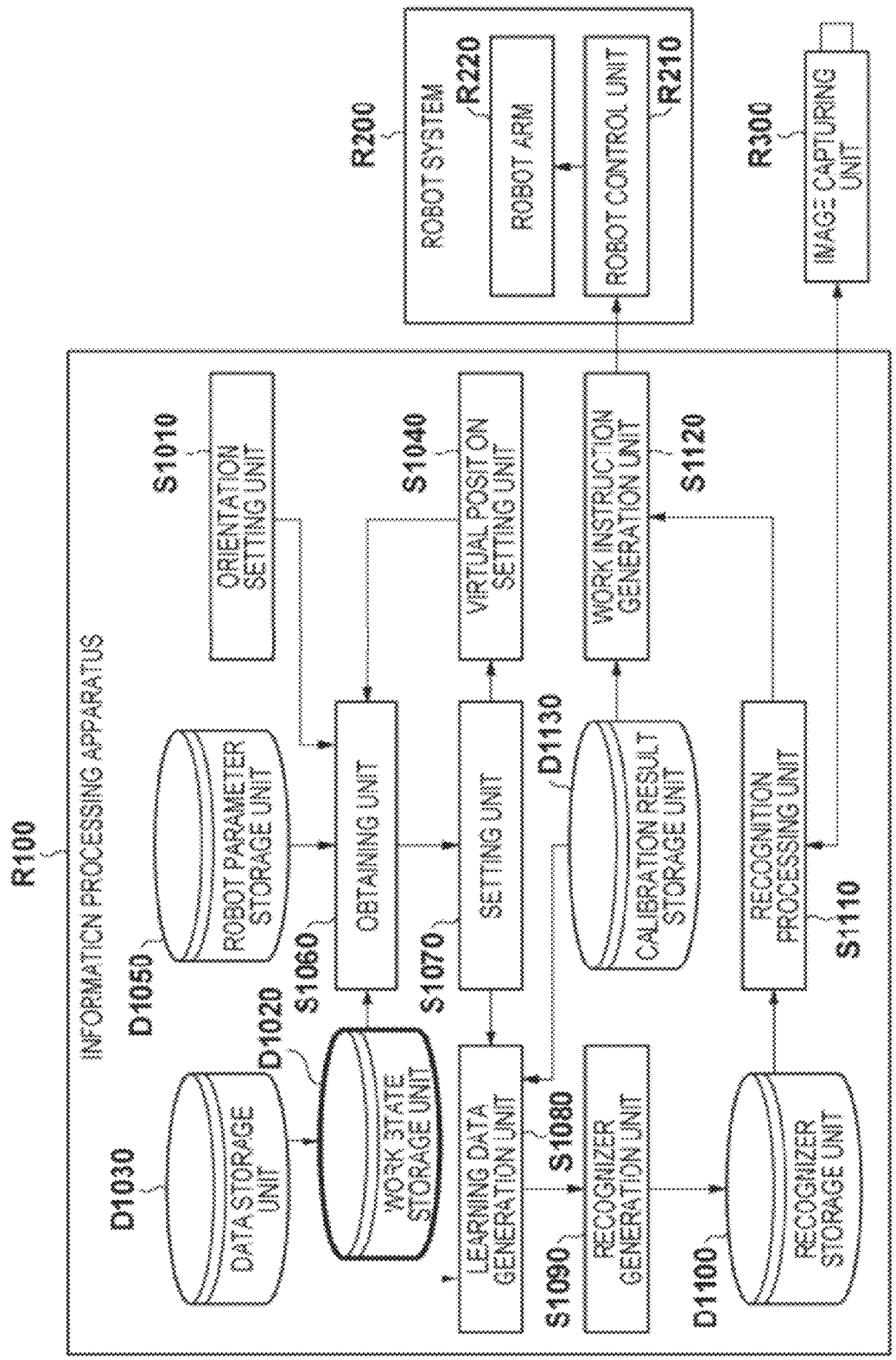

Also, processing by the work state setting unit S1020 in the first embodiment need not always be set by the user via a user interface. For example, a work state storage unit D1020 may replace the work state setting unit S1020 as in an arrangement shown in FIG. 15C. In this case, the work state storage unit D1020 stores the relative position/orientation relationship between a work subject and an end effector in work that is set by CAD or the like, and the obtaining unit S1060 reads out the relative position/orientation relationship from the work state storage unit D1020.

Note that combinations of the orientation setting unit S1010 or orientation storage unit D1010, the virtual position setting unit S1040 or virtual position storage unit D1040, and the work state setting unit S1020 or work state storage unit D1020 are arbitrary. Hence, various arrangements (not shown) are conceivable.

To visualize and confirm a restricted orientation map obtained by a setting unit S1070, a display unit S1150 may be added to the apparatus arrangement to display the restricted orientation map, as shown in FIG. 17.

Figure 16:
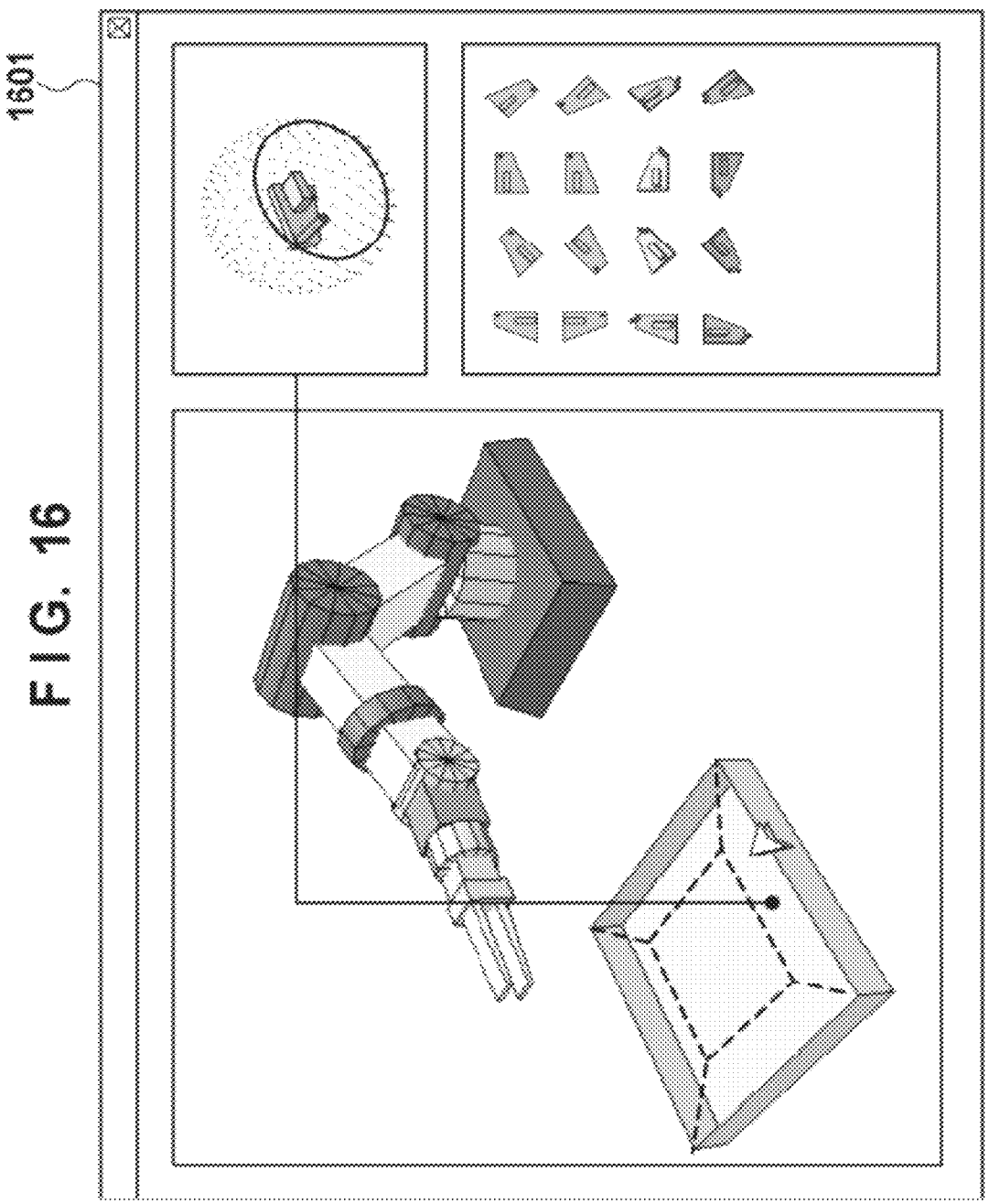
FIG. 16 is a view exemplifying a display for confirming a restricted orientation on a display unit.

FIG. 16 shows a display example of the restricted orientation map on the display unit S1150. A window 1601 displayed by the display unit S1150 represents a restricted orientation. By using a geodesic dome 401 and the computer graphics-based appearance of a work subject A400, the display unit S1150 displays the contents in the range of geometrical information selected by the setting unit S1070 in an area corresponding to a work area selected by the user on the screen. The user can visually confirm a set restricted orientation, and check a setting error, data registration error, and the like before actual work.

Figure 20:
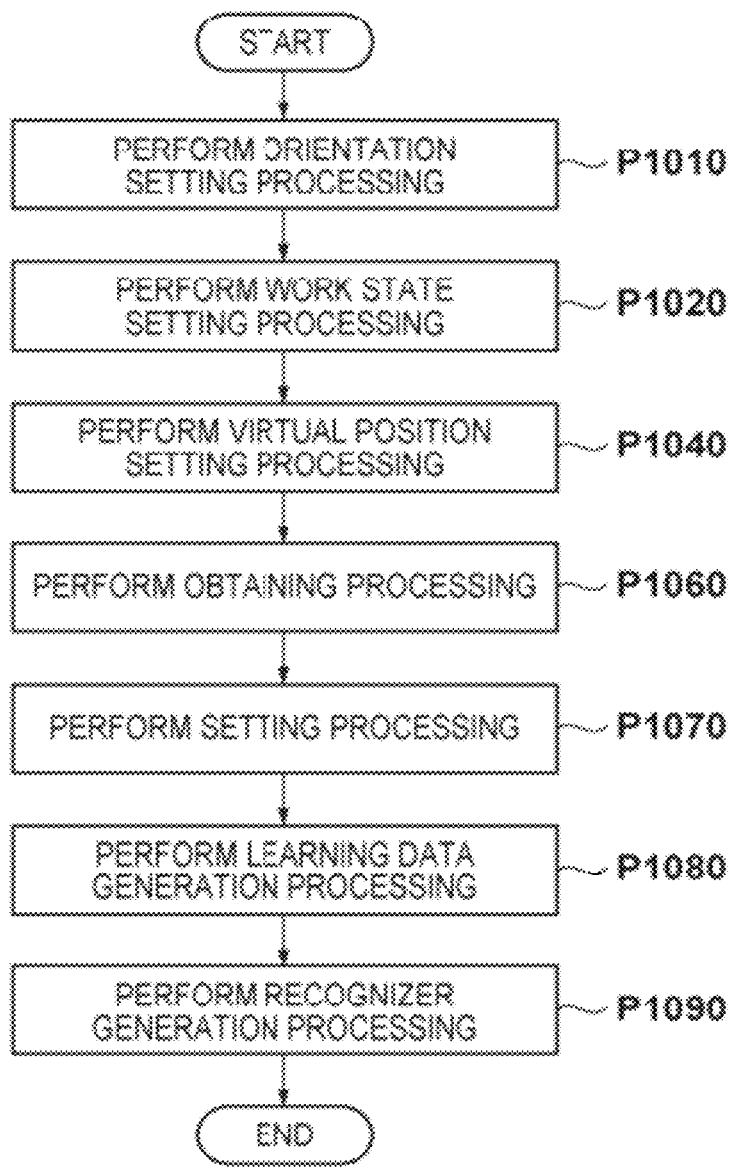
FIG. 20 is a flowchart showing a processing sequence according to the present invention.

Offline processing by the information processing apparatus R100 described in the first, second, and third embodiments can also be implemented as a series of information processes. The processing sequence will be explained with reference to the flowchart of FIG. 20.

In orientation setting step P1010, the orientation setting unit S1010 generates an orientation set which may be handled by the recognizer.

In work state setting step P1020, the work state setting unit S1020 sets the state of work on the work subject A400 by an end effector A230.

In virtual position setting step P1040, the virtual position setting unit S1040 sets a virtual position within the work area.

In obtaining step P1060, the obtaining unit S1060 calculates the orientation of the work subject A400 to be detected in consideration of possible positions and orientations of the distal end (working unit) of the robot arm.

In setting step P1070, the setting unit S1070 sets restricted orientations necessary to generate a recognizer, and sets the position/orientation range of the work subject A400.

In learning data generation step P1080, the learning data generation unit S1080 generates learning data of the work subject A400 in a restricted orientation.

In recognizer generation step P1090, the recognizer generation unit S1090 generates a recognizer using the learning data generated by the learning data generation unit S1080. Then, the process end.

According to the fourth embodiment, orientations of a work subject to be recognized can be restricted based on the workability of the robot arm for a work subject having a high degree of freedom of the orientation. The embodiment can reduce the memory capacity of a recognizer used in actual work, shorten the recognition processing time when detecting a target subject, and expect higher recognition accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-087698 filed on Apr. 11, 2011, which is hereby incorporated by reference herein in its entirety.

What is claimed is:

1. An information processing apparatus for generating a recognizer for a position and an orientation of an object to be held by a working unit of a robot arm, the information processing apparatus comprising:
   a first obtaining unit configured to obtain an orientation of the working unit that the working unit can take
   a second obtaining unit configured to obtain a relative orientation between the object and the working unit when the working unit holds the object;

a restriction unit configured to restrict a position and an orientation of the object based on the obtained orientation of the working unit and the relative orientation between the object and the working unit when the working unit holds the object; and a generating unit configured to generate a recognizer to be used for recognizing the object based on the restricted orientation of the object.

2. The apparatus according to claim 1, further comprising a determination unit configured to determine, based on presence/absence of the orientation that the working unit can take that have been obtained by said first obtaining unit, whether the working unit can hold the object, wherein, when said determination unit determines that the working unit can hold the object, said restriction unit restricts, as the orientation used for generating the recognizer, the orientation of the object corresponding to the orientation that the working unit can take.

3. The apparatus according to claim 1, wherein when the object takes a predetermined orientation at a virtual position in a work area where the object is placed, said restriction unit solves inverse kinematics of the robot arm to obtain, as the orientation that the working unit can take, a position and an orientation of the working unit corresponding to the virtual position and an orientation of the object when a solution of the inverse kinematics is obtained.

4. The apparatus according to claim 3, further comprising:

a work information calculation unit configured to calculate work possible/impossible information representing presence/absence of an orientation restricted by said restriction unit for each virtual position in the work area;

an area division unit configured to divide the work area by a Voronoi boundary using the virtual position as a reference; and a map generation unit configured to integrate areas having the same work possible/impossible information calculated by said work information calculation unit for respective areas divided by said area division unit, and to generate a map representing a distribution of the work possible/impossible information, wherein the map generated by said map generation unit is used by said generating unit for generating the recognizer.

5. The apparatus according to claim 1, further comprising a virtual position setting unit configured to set the virtual position of the object in a work area.

6. The apparatus according to claim 1, further comprising a virtual position storage unit configured to store, in advance, the virtual position of the object in a work area.

7. The apparatus according to claim 1, further comprising a display unit adapted to display an orientation restricted by said restriction unit.

8. A method of controlling an information processing apparatus for generating a recognizer for a position and an orientation of an object to be held by a working unit of a robot arm, the method comprising:

obtaining, using a first obtaining unit, an orientation of the working unit that the working unit can take obtaining, using a second obtaining unit, a relative orientation between the object and the working unit when the working unit holds the object;

restricting, using a restriction unit, a position and an orientation of the object based on the obtained orientation of the working unit and the relative orientation between the object and the working unit when the working unit holds the object; and generating, with a generating unit, a recognizer to be used for recognizing the object based on the restricted orientation of the object.

9. A non-transitory computer-readable storage medium storing a computer program for causing a computer to execute each step of an information processing apparatus control method defined in claim 8.

10. The apparatus according to claim 1, further comprising:

a learning image generating unit configured to generate a learning image of the object based on the restricted orientation of the object, wherein the generating unit generates the recognizer to be used for recognizing the object based on the learning image.

11. The apparatus according to claim 10, wherein the learning image includes the object of the restricted orientation.

12. The apparatus according to claim 10, wherein the learning image is an image when a model of the object is placed at a virtual space, and the model is observed from a direction from which the located model is seen as the restricted orientation.

13. The apparatus according to claim 12, further comprising a holding unit configured to hold the model of the object.

* * * * *